(12) United States Patent
Sarbaev

(10) Patent No.: US 10,607,195 B2
(45) Date of Patent: Mar. 31, 2020

(54) FACILITATING SELLING AND VALIDATING DIGITAL RESOURCES

(71) Applicant: ArrowPass, Inc., Walnut Creek, CA (US)

(72) Inventor: Miroslav Sarbaev, Walnut Creek, CA (US)

(*) Notice: Subject to any disclaimer, the term of this patent is extended or adjusted under 35 U.S.C. 154(b) by 324 days.

(21) Appl. No.: 15/614,607

(22) Filed: Jun. 6, 2017

(65) Prior Publication Data

US 2017/0351729 A1    Dec. 7, 2017

Related U.S. Application Data

(60) Provisional application No. 62/392,624, filed on Jun. 6, 2016.

(51) Int. Cl.
*G06Q 20/00* (2012.01)
*G06Q 20/34* (2012.01)
*G06Q 20/04* (2012.01)
*G06Q 20/38* (2012.01)

(52) U.S. Cl.
CPC ......... *G06Q 20/00* (2013.01); *G06Q 20/0457* (2013.01); *G06Q 20/341* (2013.01); *G06Q 20/382* (2013.01)

(58) Field of Classification Search
CPC ... G06Q 20/20; G06Q 20/0457; G06Q 20/341
See application file for complete search history.

(56) References Cited

U.S. PATENT DOCUMENTS

| | | | |
|---|---|---|---|
| 7,367,063 B1* | 4/2008 | O'Toole, Jr. .......... | G06F 21/554 713/183 |
| 2003/0061605 A1* | 3/2003 | Genevois ............... | G06Q 20/04 725/6 |
| 2009/0265270 A1* | 10/2009 | Gangaraju ........... | G06Q 20/105 705/41 |
| 2012/0310880 A1* | 12/2012 | Giampaolo ......... | G06F 16/2471 707/610 |
| 2016/0307198 A1* | 10/2016 | Li ........................ | G06Q 20/341 |

* cited by examiner

*Primary Examiner* — Loc Tran

(57) ABSTRACT

The subject disclosure relates to generating a set of token data for storage at a first data store of a first device, wherein the set of token data comprises at least two or more of flag data, no state data, first state data, second state data, event identification data, or token identification data. In an aspect, the disclosure further includes, assigning the flag data to the no state data within the first data store of the first device. Also, the disclosure includes the reassignment of the flag data from the no state data to the first state data based on an occurrence of a first validation event by a second device.

18 Claims, 20 Drawing Sheets

1300

1310 — GENERATING, BY A SYSTEM COMPRISING A PROCESSOR, A SET OF TOKEN DATA FOR STORAGE AT A FIRST DATA STORE OF A FIRST DEVICE, WHEREIN THE SET OF TOKEN DATA COMPRISES AT LEAST TWO OR MORE OF FLAG DATA, NO STATE DATA, FIRST STATE DATA, SECOND STATE DATA, EVENT IDENTIFICATION DATA, OR TOKEN IDENTIFICATION DATA.

1320 — ASSIGNING, BY THE SYSTEM, THE FLAG DATA TO THE NO STATE DATA WITHIN THE FIRST DATA STORE OF THE FIRST DEVICE.

1330 — REASSIGNING, BY THE SYSTEM, THE FLAG DATA FROM THE NO STATE DATA TO THE FIRST STATE DATA BASED ON AN OCCURRENCE OF A FIRST VALIDATION EVENT BY A SECOND DEVICE.

1410 — GENERATING, BY A SYSTEM COMPRISING A PROCESSOR, A SET OF TOKEN DATA FOR STORAGE AT A FIRST DATA STORE OF A FIRST DEVICE, WHEREIN THE SET OF TOKEN DATA COMPRISES AT LEAST TWO OR MORE OF FLAG DATA, NO STATE DATA, FIRST STATE DATA, SECOND STATE DATA, EVENT IDENTIFICATION DATA, OR TOKEN IDENTIFICATION DATA.

1420 — ASSIGNING, BY THE SYSTEM, THE FLAG DATA TO THE NO STATE DATA WITHIN THE FIRST DATA STORE OF THE FIRST DEVICE.

1430 — REASSIGNING, BY THE SYSTEM, THE FLAG DATA FROM THE NO STATE DATA TO THE FIRST STATE DATA BASED ON AN OCCURRENCE OF A FIRST VALIDATION EVENT BY A SECOND DEVICE.

1440 — REASSIGNING, BY THE SYSTEM, THE FLAG DATA FROM THE FIRST STATE DATA TO THE SECOND STATE DATA BASED ON AN OCCURRENCE OF A SECOND VALIDATION EVENT BY A SECOND DEVICE, WHEREIN THE FIRST VALIDATION EVENT AND THE SECOND VALIDATION EVENT IS A DETECTION OF THE FIRST DEVICE BY THE SECOND DEVICE.

1510 — GENERATING, BY A SYSTEM COMPRISING A PROCESSOR, A SET OF TOKEN DATA FOR STORAGE AT A FIRST DATA STORE OF A FIRST DEVICE, WHEREIN THE SET OF TOKEN DATA COMPRISES AT LEAST TWO OR MORE OF FLAG DATA, NO STATE DATA, FIRST STATE DATA, SECOND STATE DATA, EVENT IDENTIFICATION DATA, OR TOKEN IDENTIFICATION DATA.

1520 — ASSIGNING, BY THE SYSTEM, THE FLAG DATA TO THE NO STATE DATA WITHIN THE FIRST DATA STORE OF THE FIRST DEVICE.

1530 — COMPARING, BY THE SYSTEM, THE EVENT IDENTIFICATION DATA AND THE TOKEN DATA STORED ON THE FIRST DATA STORE OF THE FIRST DEVICE TO KNOWN IDENTIFICATION DATA AND KNOWN TOKEN IDENTIFICATION DATA STORED ON A SECOND DATA STORE OF THE SECOND DEVICE.

1540 — REASSIGNING, BY THE SYSTEM, THE FLAG DATA FROM THE NO STATE DATA TO THE FIRST STATE DATA BASED ON AN OCCURRENCE OF A FIRST VALIDATION EVENT BY A SECOND DEVICE.

1610 — GENERATING, BY A SYSTEM COMPRISING A PROCESSOR, A SET OF TOKEN DATA FOR STORAGE AT A FIRST DATA STORE OF A FIRST DEVICE, WHEREIN THE SET OF TOKEN DATA COMPRISES AT LEAST TWO OR MORE OF FLAG DATA, NO STATE DATA, FIRST STATE DATA, SECOND STATE DATA, EVENT IDENTIFICATION DATA, OR TOKEN IDENTIFICATION DATA.

1620 — ASSIGNING, BY THE SYSTEM, THE FLAG DATA TO THE NO STATE DATA WITHIN THE FIRST DATA STORE OF THE FIRST DEVICE.

1630 — COMPARING, BY THE SYSTEM, THE EVENT IDENTIFICATION DATA AND THE TOKEN DATA STORED ON THE FIRST DATA STORE OF THE FIRST DEVICE TO KNOWN IDENTIFICATION DATA AND KNOWN TOKEN IDENTIFICATION DATA STORED ON A SECOND DATA STORE OF THE SECOND DEVICE.

1640 — VERIFYING, BY THE SYSTEM, THAT THE EVENT IDENTIFICATION DATA AND THE TOKEN DATA ARE SUBSTANTIALLY SIMILAR TO THE KNOWN EVENT IDENTIFICATION DATA AND THE KNOWN TOKEN IDENTIFICATION DATA RESPECTIVELY, BASED ON A COMPARISON OF THE EVENT IDENTIFICATION DATA AND THE TOKEN DATA TO THE KNOWN EVENT IDENTIFICATION DATA AND THE KNOWN TOKEN IDENTIFICATION DATA.

1640 — REASSIGNING, BY THE SYSTEM, THE FLAG DATA FROM THE NO STATE DATA TO THE FIRST STATE DATA BASED ON AN OCCURRENCE OF A FIRST VALIDATION EVENT BY A SECOND DEVICE AND A VERIFICATION OF THE COMPARISON.

FIG. 16

FACILITATING SELLING AND VALIDATING DIGITAL RESOURCES

CROSS-REFERENCE TO RELATED APPLICATION

This non-provisional application claims priority of and claims the benefit of priority to U.S. Provisional Patent Application No. 62/392,624, filed on Jun. 6, 2016, which is a U.S. provisional patent application and entitled "Method and Apparatus for Selling and Validating Digital Resources". The entirety of the disclosure of the aforementioned application is considered part of, and is incorporated by reference in, the disclosure of this application.

BACKGROUND

The advent of distributing and validating tokens encoded on contact or contactless smart cards has lead to the presentation of problems associated with efficient management of resources and transactional data associated with smart cards. The problem of storing resources and validating resources for storage in relation to smart cards arises in many real-world instances.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ grouping components to group oil and gas exploration equipment failure data into one or more failure type groups and facilitate identification of equipment failure types.

According to an embodiment, a system and method is provided that relates generally to secure transactions using devices with integrated smart chips, such as, for example, plastic integrated circuit cards ("smart cards"). Specifically, the present invention describes a system for using digital resources on smart cards ("tokens") such as token data capable of transitioning among various states based on an occurrence of respective events. According to an embodiment, a system is provided. The system can comprise a memory that stores executable components. The system can also comprise a processor, operably coupled to the memory. The computer executable components can comprise a generation component that generates a set of token data for storage at a first data store of a first device, wherein the set of token data comprises one or more of flag data, no state data, first state data, second state data, event identification data, or token identification data. In another aspect, the system can comprise an assignment component that assigns the flag data to the no state data within the first data store of the first device. Furthermore, in an aspect, the system can comprise a first transition component that reassigns the flag data from the no state data to the first state data based on an occurrence of a first validation event by a second device.

According to another embodiment, a computer-implemented method is provided. The computer-implemented method can comprise generating, by a system comprising a processor, a set of token data for storage at a first data store of a first device, wherein the set of token data comprises at least two or more of flag data, no state data, first state data, second state data, event identification data, or token identification data. The method computer-implemented method can further comprise assigning, by the system, the flag data to the no state data within the first data store of the first device. Also, the computer-implemented method can further comprise a first transition component that reassigns, by the system, the flag data from the no state data to the first state data based on an occurrence of a first validation event by a second device.

According to another embodiment, a computer program product is provided. The computer program product can comprise a computer readable storage medium having program instructions embodied therewith. The program instructions can be executable by a processor to cause the processor to generate a set of token data for storage at a first data store of a first device, wherein the set of token data comprises at least two or more of flag data, no state data, first state data, second state data, event identification data, or token identification data. The program instructions can also cause the processor to assign the flag data to the no state data within the first data store of the first device. Furthermore, the program instructions can reassign the flag data from the no state data to the first state data based on an occurrence of a first validation event by a second device.

BRIEF DESCRIPTION OF THE DRAWINGS

FIG. 13 illustrates a flow diagram of an example, non-limiting computer-implemented method that generates token data capable of representing a change in states or status in accordance with one or more embodiments described herein.

FIG. 14 illustrates a flow diagram of an example, non-limiting computer-implemented method that reassigns flag data from a first state to a second state in accordance with one or more embodiments described herein.

FIG. 15 illustrates a flow diagram of an example, non-limiting computer-implemented method that compares event identification data and token data to known event identification data and known token identification data respectively in accordance with one or more embodiments described herein.

FIG. 16 illustrates a flow diagram of an example, non-limiting computer-implemented method that verifies that event identification data and token data are substantially similar to known event identification data and known token identification data respectively in accordance with one or more embodiments described herein.

DETAILED DESCRIPTION

Figure 1A:
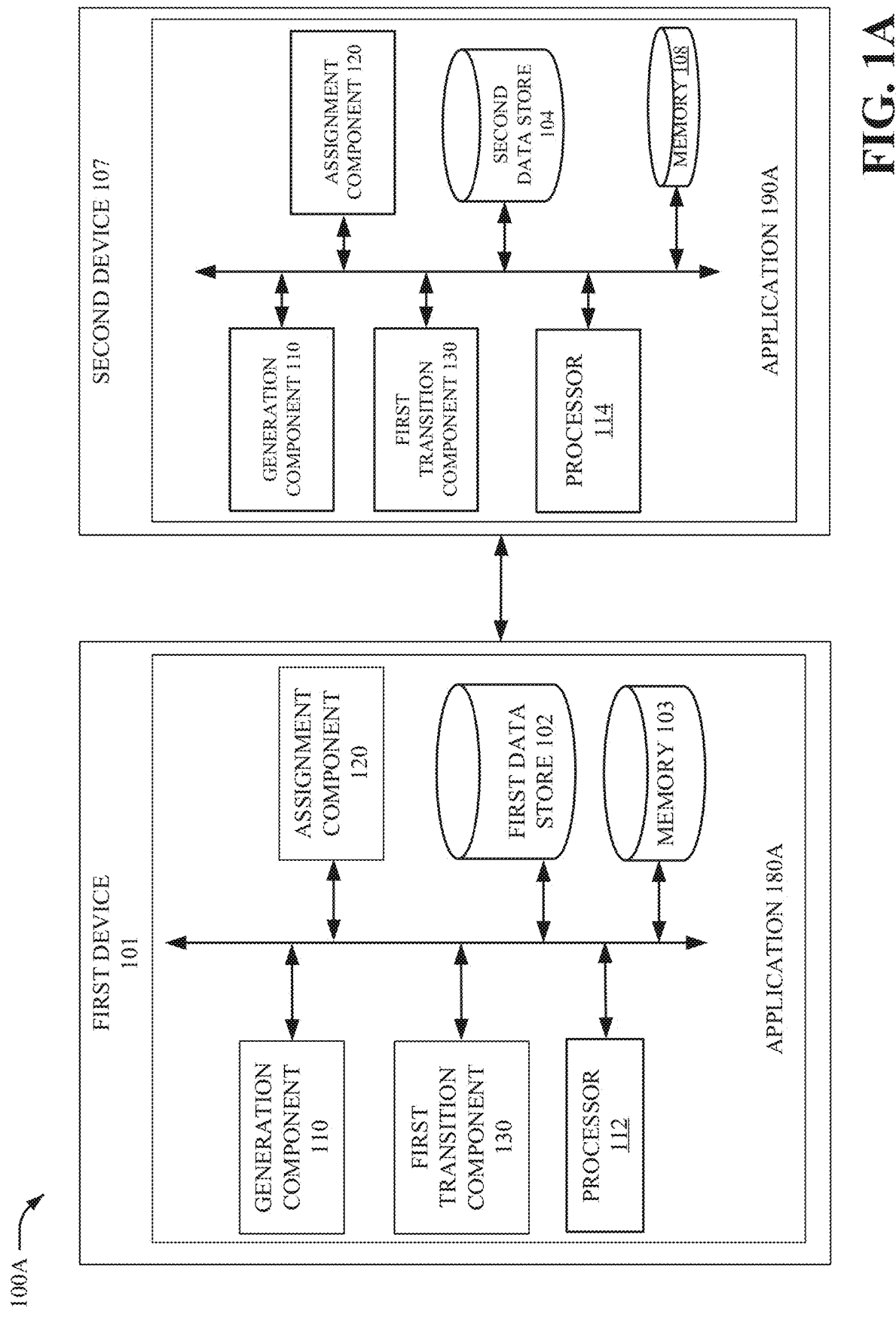
FIG. 1A illustrates a block diagram of an example, non-limiting system that can facilitate a generation of token data capable of representing one or more state or status in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In an aspect, digital resources, such as digital tokens, can be stored on smart cards which comprise a microcontroller embedded into a card housing and equipped with a communication interface. The microprocessor of a smart card can allow for a host computer (e.g., computer terminal) to communicate with the microprocessor. In return, the microprocessor can authorize or reject access to the data on the smart card. Furthermore, in an aspect, a smart card can communicate with other devices via a contact-based or contactless system. A contact-based smart card or memory card (e.g., straight memory card, protected memory card, segmented memory card, stored value memory card, etc.) can communicate (e.g., using the communication interface) with a smart card terminal based on physical contact with the device. For instance, a chip on the smart card can be inserted into the reader of another device or a magnetic strip associated with the smart card can be swiped in order to communicate with another device. In an aspect, the insertion of first device 101 into a reader establishes a physical contact that allows for transmission of commands, data, and/or first device 101 (e.g., smart card) status to take place.

In another aspect, a smart card can be a contactless smart card (e.g., multifunction cards) that can employ a wireless communication technology (e.g., RFID, Bluetooth®, etc.) to communicate with another device (e.g., reader, computer terminal, etc.) without requiring a physical insertion of the card into another device (e.g., communication using an antenna embedded within the smart card). In yet another aspect, smart cards can communicate using either or both of a contact-based and contactless communication mechanism. This subject matter disclosed herein relates to secure transactions using devices comprising integrated smart chips, such as smart cards (e.g., circuit cards integrated into a plastic housing) for example. In an aspect, the disclosed subject matter includes a system for generating, storing, accessing, and/or transitioning digital resources (e.g., tokens) on smart cards, where such resources are capable of transitioning through a token lifecycle based on events that occur to the device (e.g., smart card). Furthermore, in an aspect, the disclosure also describes systems and methods for managing the token lifecycle, such as existing token states and transitions between various token states. Furthermore, systems and method are also disclosed that include replicating transactional data (e.g., token data, flag data, log data, etc.) using a mesh network.

FIG. 1A illustrates a block diagram of an example, non-limiting system 100A that can facilitate a generation of token data capable of representing one or more state or status in accordance with one or more embodiments described herein. In an aspect, system 100A can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 180A comprising generation component 110, assignment component 120, first transition component 130, and first data store 102. In another aspect, first device 101 can comprise processor 112 and memory 103. In an aspect, processor 112 can execute the computer executable components and/or computer instructions stored in memory 103.

In another aspect, system 100A can also comprise second device 107 that can employ application 190A comprising generation component 110, assignment component 120, first transition component 130, and second data store 104. In an aspect, second device 107 can comprise processor 114 and memory 108. In another aspect, processor 112 can execute the computer executable components and/or computer instructions stored in memory 108. In yet another aspect, one or more of the components of system 100A can be electrically and/or communicatively coupled to one or more devices of system 100A or other embodiments disclosed herein.

For instance, first device 101 can be a contact-based or contactless smart card comprising a microcontroller (e.g., integrated circuits, microchip, memory, etc.) embedded into a card (e.g., plastic card). In an aspect, the microcontroller can employ the components of application 180A and store such components in memory 103 as well as execute such components using processor 112. In another aspect, the microcontroller is programmed to work with another device (e.g., second device 107) such as a smart card terminal. In an aspect, second device 107 can also be referred to as a validation terminal in that the computer terminal can validate electronic tokens encoded (e.g., stored) on first device 101. Furthermore, interactions between first device 101 and second device 107 can represent the occurrence of a transaction between a smart card and a validation terminal. In another aspect, first device 101 can communicate with second device 107 using a physical interaction (e.g., insertion into a card reader) or a non-physical interaction (e.g., using RFID, radio frequencies, BLUETOOTH®, etc.). In another aspect, first device 101 can store, at a first data store 102, a set of data (e.g., token data, flag data, state data/status data, log data, transaction data, etc.), executable code, or both executable code and a set of data.

In an aspect, a second device 107 (e.g., validation terminal, smart card terminal, etc.) can be used to securely read data stored on first device 101 (e.g., smart card) and/or transmit correspondence to and from first device 101. For example, second device 107 can employ system 100A components to transmit one or more command to first device 101 and system 100 components employed by first device 101 can carry out the one or more command issued by second device 107. Furthermore, in an aspect, first device 101 can employ system 100A components to facilitate a transmission of command responses to system 100A components of second device 107. In an instance, second device 107 can employ processor 114 to execute a generation component 110 to issue a command or instruction to first device 101 to generate a set of token data. In a non-limiting embodiment, second device 107 can comprise a screen component, keyboard component, and/or printer component to facilitate an intake of input information and a presentation of information.

In an aspect, system 100A can employ a processor (e.g., processor 112 of first device 101, processor 114 of second device 107) to execute generation component 110 to generate the set of token data (e.g., within first device 101) pursuant to a command issued by second device 107. In another aspect, first device 101 can employ a logging component 710 (described in more detail below) to log the occurrence of transactions between first device 101 and second device 107 (and other devices) such as an issuance of token data generation instructions and/or a transmission of log data to second device 107, where the log data also represents a response to the issued command by second device 107. In yet another aspect, second device 107 or another device (e.g., another terminal device such as a programming terminal) can issue a command to load an executable program or application onto first device 101, where program components can be executed by processor 112. For instance, system 100A can be loaded onto a memory 103 of first device 101 and processor 112 can execute components associated with system 100A that can be based on issued commands from second device 107 or another device. Furthermore, second device 107 can retrieve log data from first device 101 confirming the execution of the issued command. In yet another aspect, second device 107 can store (e.g., at second data store 104) known token identification data for comparison with and authentication of the token data generated by first device 101.

As such, second device 107 can access and/or read data stored on device 101. In an aspect, second device 107 can access data (e.g., set of token data) stored (e.g., at first data store 102) on first device 101 using one or more cryptographic access keys to mitigate cybersecurity breaches and facilitate access to sensitive data at first device 101 by only authorized devices. For instance, in a non-limiting example, system 100A may be employed by a first device 101 that is a MasterCard®, PayPass® contactless smart card, or a NXP MIFARE DESfire contactless smart card. Furthermore, in an aspect, data (e.g., token data, data corresponding to performance of tasks, log data, flag data, etc.) stored on first data store 102 of first device 101 can be read by an application (e.g., application 190A and corresponding components) executing on second device 107. For instance, as a non-limiting example, second device 107 can be a mobile device capable of communicating with first device 101 over a contact-based (e.g., USB, card-insertion slot, microchip reader, strip swiping mechanism, etc.) or contactless (e.g., RFID, BLUETOOTH®, radio frequency interface, etc.) interface. In another aspect, second device 107 can employ a Secure Access Module (SAM) in connection with memory 108 to store access keys configured to access data stored at first device 101.

Accordingly, in an aspect, system 100A executing on second device 107 can execute (e.g., using processor 114) generation component 110 to issue a command to first device 101 to generate (e.g., using generation component 110 executing by processor 114 on first device 101) a set of token data for storage at a first data store 102 of first device 101. In an aspect, a subset of token data stored at first data store 102 of first device 101 can represent a resource that corresponds to a transactional event. For instance, a first subset of token data (e.g., ticket data, entrance data) can represent a ticket, license, and/or permit entitling and authorizing first device 101 (e.g., and the user, owner, operator of first device 101), which stores the token data, to perform an authorized activity (e.g., enter a venue). For instance, a user can be granted first device 101 upon paying to enter a concert venue and first device 101 can be a smart card with ticket data stored on first data store 102 of first device 101. Furthermore, the ticket data can indicate that first device 101 and identification data associated with a user of first device 101 are authorized to enter the concert venue pursuant to the ticket data.

In another aspect, a second subset of token data (e.g. payment data) stored on first data store 102 of first device 101 can represent a preauthorized amount of money capable of being expended using first device 101. For instance, payment data can be stored at first data store 102 of first device 101 based on a user authorizing a preauthorized amount of money to be available (e.g., linking device 101 to a credit card) for expenditure (e.g., purchasing goods and/or services) at the concert venue on various desired activities. Furthermore, if first device 101 does not transmit payment data to other devices in connection with the purchase of a good or service, then the user never incurs a transaction and no money is charged to an authorized user payment mechanism (e.g., credit card, bank account, etc.).

In yet another aspect, a third subset of token data (e.g., flag data) stored on first data store 102 of first device 101 can represent a mark to signal a condition/status of a device (e.g., first device 101), an object to indicate that a particular event has occurred or that the marked object is unusual in some way. For instance, flag data stored at first data store 101 can be accessed (e.g., by second device 107), read (e.g., by second device 107 to determine a status of first device 101), modified, expressed, and/or assigned to status data to indicate a change in status of first device 101. For instance, if second device 107 accesses and reads stored event ticket data at first data store 102 of first device 101 upon entering a concert venue, then flag data of first device 101 can be reassigned from a first subset of ticket data indicating that first device 101 is authorized to enter the concert venue (e.g., first state data) to a second subset of ticket data indicating that first device 101 has entered the concert venue and is now inside the concert venue (e.g., second state data). Also, in an aspect, a fourth subset of token data (e.g., no state data) can represent that first device 101 is not authorized to perform any activity. For instance, if a set of ticket data is not loaded onto first device 101, then second device 107 can attempt to access and read a set of ticket data stored on first device 101, but retrieve no state data indicating first device 101 is not authorized to enter the concert venue.

In another aspect, a fifth subset of token data (e.g., log data) can represent the occurrence of a transactional event corresponding to first device 101. For instance, second device 107 can access ticket data stored at first data store 102 of first device 101 to ensure that the ticket data is valid and/or that a user of first device 101 is authorized to possess first device 101 storing the valid ticket data. For instance, user identification information can also be stored and or combined with ticket data to provide a mechanism to authenticate a user of first device 101. Upon validation of the ticket data by second device 107, log data can be generated in association with such transactional event (e.g., validation of the ticket by second device 107). In yet another aspect, a sixth subset of token data can represent event identification data that identifies an authorized event associated with first device 101. For instance, a user can pay for a ticket to a rock concert to be held on Jun. 22, 2017, thus first device 101 can be provided to the user, where first device 101 ticket data and event identification data (e.g., a reference number, a numerical value, etc.) that authorizes first device 101 (upon comparison to known event identification data) to enter a venue for the particular rock concert event held on Jun. 22, 2017.

In another aspect, a seventh subset of token data (e.g., token identification data) can represent an identity of a particular token and/or the identity of first device 101 storing the particular token (e.g., token encoded on a smart card). Thus, the first device 101 can be verified as a valid device and the event associated with a subset of token data can be verified as an event first device 101 is authorized to enter. Also, in an aspect, an eighth subset (e.g., first state data) of data and ninth subset of data (e.g., second state data) can represent a first state and a second state respectively of token data stored on first device 101. For instance, first state data can be associated with first device 101 being inside the event venue and second state data can be associated with first device 101 being outside the event venue.

Accordingly, the subject disclosure describes systems, methods, and several embodiments of a token data lifecycle and one or more implementations of the token data lifecycle. Furthermore, described herein is the capability of replicating data offline including token data lifecycle data. For instance, data (e.g., the set of token data including payment data, state data, ticket data, etc.) can be transferred (e.g., in an offline environment or an online environment), synchronized, and/or replicated between first device 101 and second device 107 using contactless transmission techniques (e.g., RFID, BLUETOOTH®) thus avoiding data transfer issues associated with online transmission techniques (e.g., network failures, low bandwidth, etc.). Furthermore, the offline transmission techniques also provide data security safeguards (e.g., not subject to network hacking) associated with offline sharing and transmission of full data sets (e.g., token lifecycle data, transaction data, etc.) stored on several devices (e.g., smart cards and several validation terminals) are disclosed herein. In another aspect, described herein is the deployment of a customizable SAM with flexible permissions management. For instance, first device 101 can comprise a SAM that can require mutual authentication of first device 101 by second device 107 and of second device 107 by first device 101 before an offline data transfer can occur. As a non-limiting example of mutual identification, the first device 101 must verify the identity of second device 107 and the second device 107 must verify the identity of first device 101 in order to access data, transmit data, transmit commands/instructions, conduct transactions with one another and/or synchronize data.

Figure 1B:
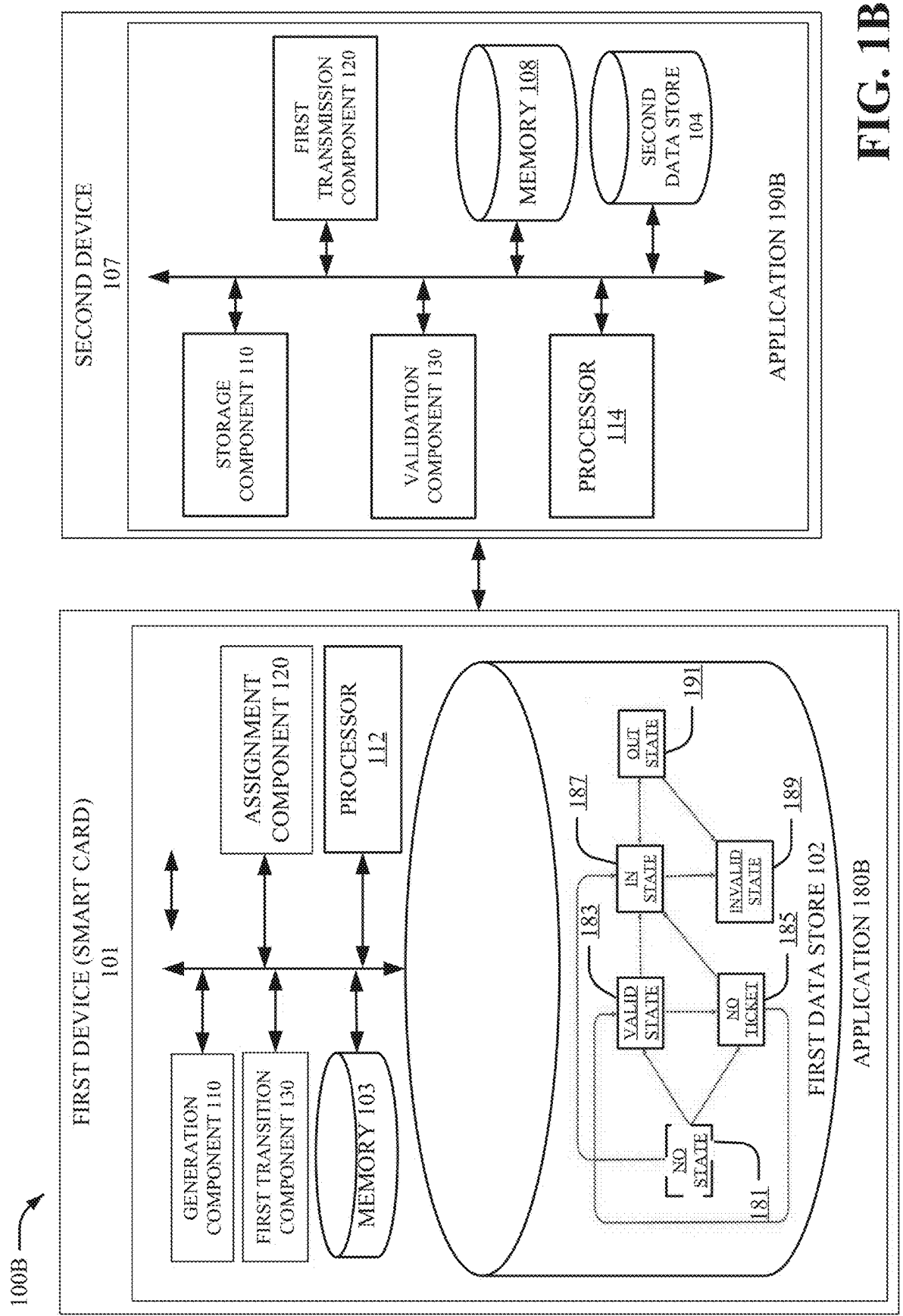
FIG. 1B illustrates a block diagram of an example, non-limiting system that can facilitate a generation of a set of token data capable of representing one or more state or status of a subset of token data and a transitioning of a subset of token data between one or more state in accordance with one or more embodiments described herein.

Turning now to FIG. 1B, illustrated is a block diagram of an example, non-limiting system 100B that can facilitate a generation of a set of token data capable of representing one or more state or status of a subset of token data and a transitioning of a subset of token data between one or more state in accordance with one or more embodiments described herein. Repetitive description of like elements employed in other embodiments described herein is omitted for sake of brevity.

FIG. 1B illustrates a block diagram of an example, non-limiting system 100B that can facilitate a generation of token data capable of representing one or more state or status in accordance with one or more embodiments described herein. In an aspect, system 100B can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 180B comprising generation component 110, assignment component 120, first transition component 130, and first data store 102. In another aspect, first device 101 can comprise processor 112 and memory 103. In an aspect, processor 112 can execute the computer executable components and/or computer instructions stored in memory 103.

In another aspect, system 100B can also comprise second device 107 that can employ application 190B comprising generation component 110, assignment component 120, first transition component 130, and second data store 104. In an aspect, second device 107 can comprise processor 114 and memory 108. In another aspect, processor 112 can execute the computer executable components and/or computer instructions stored in memory 108. In yet another aspect, one or more of the components of system 100B can be electrically and/or communicatively coupled to one or more devices of system 100B or other embodiments disclosed herein. Furthermore, in an aspect, system 100B and the several other system embodiments disclosed herein can comprise state data stored in first data store 102, including, but not limited to, no state data 181, valid state data 183, in state data 187, out state data 191, no ticket data 185, and/or invalid state data 189. In an aspect, one or more of the components of system 100B can be electrically and/or communicatively coupled to one or more devices of system 100B or other embodiments disclosed herein.

In an aspect, system 100B can employ a processor (e.g., processor 112 of device 101, processor 114 of second device 107) to execute components that facilitate a transition of token data subsets (e.g., stored in first data store 102) representing token states or one or more token status corresponding to respective stages in a token data lifecycle. For instance, the token stages associated with an event can include generating first token data associated with a valid ticket granting permission to enter the event, generating second token data representing entering the event upon presenting the first token data to a validation terminal, generating third token data (e.g., using payment data) by purchasing merchandise at the event, generating fourth token data representing exiting (e.g., by first device 101) the event venue. The set of token data can be fully utilized to conduct offline operations (e.g., between first device 101 and second device 107) without needing to communicate with a server device. In an aspect, the set of token data can be stored at a first data store 102 of first device 101 (e.g., a smart card), processed locally by a microprocessor of first device 101, and be utilized for one or more operations performed by first device 101. The token data can comprise structured data that can facilitate a logical organization of data, an efficient accessing of data (e.g., via organized data referencing methods), and/or efficient referencing of records (e.g., transaction records).

In another aspect, the set of token data can comprise flag data within a subset of token data such that the flag data can indicate that the device (e.g., first device 101 and device user) storing the token data performed a task, activity, and/or operation. For instance, a first device 101 that has entered an event venue pursuant to an authorized ticket (e.g., represented by ticket data on first device 101) stored on first device 101, can have flag data embedded within a subset of token data that represents first device 101 being inside the event venue. As an example, as first device 101 communicates (e.g., using contactless offline technique) with second device 107, second device 107 can access and read the token data corresponding to ticket data to determine the validity of such data. Upon a determination that the ticket data is valid, second device 107 can authorize first device 101 to enter a venue (e.g., pursuant to ticket data). Accordingly, flag data can be reassigned or stored at a different location within a subset of token data to represent that first device 101 has entered the event venue. The location of the flag data within a set of token data can represent a status of first device 101 (e.g., stage in the the token lifecycle). The transition of the flag data to a different location within the token data can be based on the validation (e.g., using authentication techniques) of the ticket data by second device 107 also referred to as a transaction event.

In an aspect, flag data can represent that a particular event has occurred in association with first device 101. Thus, flag data can be used to update the status of first device 101 and associated identifiers, entitlements, and/or prohibitions on first device 101 (e.g., a user owning or possessing first device 101). The transition of flag data within subsets of token data based on the occurrence of triggering events by first device 101 can be referred to as a token lifecycle. In an aspect, system 100A, 100B and other embodiments disclosed herein can employ system components that facilitate the transmission of flag data within subsets of token data to indicate a transition through a range of states corresponding to subsets of token data which are in turn associated with events or activities undertaken by first device 101.

In an aspect, system 100A and system 100B can employ an assignment component 120 that assigns the flag data to the no state data 181 within the first data store 102 of the first device 101. In an aspect, first device 101 that does not store ticket data can be determined to have no status or no state. Thus, upon second device 107 reading first device 101 that does not store a ticket, second device 107 can attempt to access and read ticket data only to find that no ticket data exists thus assigning (e.g., using assignment component 120) flag data within token data of first device 101 to no state data 181 (e.g., representing no state of first device 101) stored in first data store 102. In another aspect, the absence of token data or ticket data for access by second device 107 can be determined by second device 107 to identify first device 101 as having no state. Accordingly, assignment component 120 assigns flag data to correspond to no state data 181 within first device 101 in the absence ticket data being loaded on or generated (e.g., using generation component 110) within first device 101.

In another aspect, system 100A and system 100B can employ a first transition component 130 that reassigns the flag data from corresponding with no state data 181 to first state data (e.g., valid state data 183) based on an occurrence of a first validation event by a second device 107. For instance, ticket data can be stored on first device 101 and second device 107 can read (e.g., first validation event) data stored on first device 101 to discover the existence of a subset of token data (e.g., ticket data) that represents a valid ticket to enter an event venue. As such, first transition component 130 reassigned flag data from no state data 181 to correspond with valid state data 183 (e.g., first state data) upon occurrence of ticket data being detected and accessed on first device 101 or second device 107 reading the ticket data on first device 101. Furthermore, second device 107 can read the ticket data stored on first data store 102 of first device 101 and determine that first device 101 has not yet entered the venue.

In an aspect, first transition component 130 can facilitate a reassignment of flag data to correspond to numerous types of token data stored on first device 101 including, but not limited to, no state data 181, valid state data 183, in state data 187, no ticket data 185, invalid state data 189, and/or out state data 191. However, in a token data lifecycle first state data can often be represented by no state data 181 and second state data can be represented by valid state data 183 or no ticket data 185. In another aspect, the transitioning of token data on a smart card between respective states can be applied to several scenarios aside from event venues. For instance, the transitioning among several token states can be applied to the use of token data stored on smart cards in several industry scenarios including, but not limited to the use of token data and smart cards in the following industries; enterprise identification, finance, biometric data, cybersecurity, healthcare, identity applications, internet of things applications (e.g., smart city uses, payment systems, etc.), telecommunications applications, transportation applications, government smart card scenarios (e.g., immigration status transitions, transportation status), and other such uses of smart cards where various data stored on a smart card can transitioned through a range of states.

Figure 2:
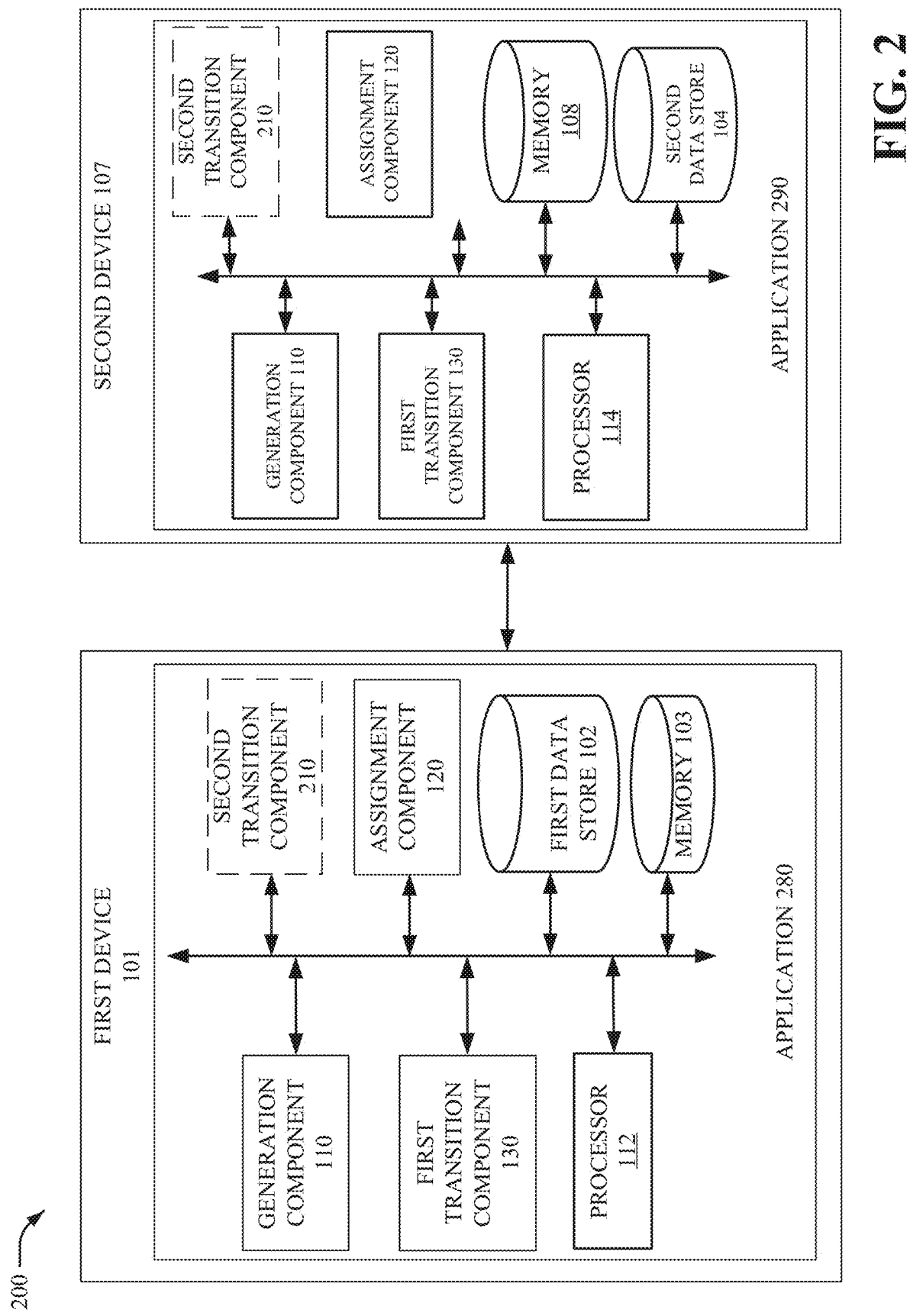
FIG. 2 illustrates a block diagram of an example, non-limiting system that can facilitate a generation of token data and reassigning flag data from first state data to second state data in accordance with one or more embodiments described herein.

Turning now to FIG. 2, illustrated is a block diagram of an example, non-limiting system 200 that can facilitate a generation of token data and reassigning flag data from first state data to second state data in accordance with one or more embodiments described herein. Repetitive description of like elements employed in other embodiments described herein is omitted for sake of brevity.

In an aspect, system 200 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 280 comprising generation component 110, assignment component 120, first transition component 130, and/or first data store 102. In another aspect, first device 101 can comprise processor 112 and memory 103. In an aspect, processor 112 can execute the computer executable components and/or computer instructions stored in memory 103.

In another aspect, system 200 can also comprise second device 107 that can employ application 290 comprising generation component 110, assignment component 120, first transition component 130, and/or second data store 104. In an aspect, second device 107 can comprise processor 114 and memory 108. In another aspect, processor 112 can execute the computer executable components and/or computer instructions stored in memory 108. In yet another aspect, one or more of the components of system 200 can be electrically and/or communicatively coupled to one or more devices of system 200 or other embodiments disclosed herein. Furthermore, in an aspect, system 200 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 2 but illustrated in FIG. 1B). Furthermore, in an aspect, system 200 can further comprise a second transition component 210 within application 280 of first device 101 and/or application 290 of second device 107. In an aspect, one or more of the components of system 200 can be electrically and/or communicatively coupled to one or more devices of system 200 or other embodiments disclosed herein.

In an aspect, system 200 can employ a processor (e.g., processor 112 of device 101, processor 114 of second device 107) to execute second transition component 210 to reassign flag data from the first state data to the second state data based on a second validation event by the second device 107, wherein the first validation event and the second validation event is a detection of the first device 101 by the second device 107. In accordance with the token data lifecycle, second device 107 can read data stored at first device 101 and identify valid state data 183 (e.g., ticket data). Pursuant to such first validation event (e.g., second device 107 reading ticket data stored on first device 101), first transition component 130 can reassign flag data stored on first device 101 to transition such flag data from corresponding with no state data 181 to valid state data 183. In another aspect, system 200 can employ second transition component 210 to reassign flag data stored on first device 101 from valid state data 183 to in state data 187 upon first device 101 entering the event venue.

For instance, second device 107 can read device 101 and detect device 101 entering the event venue after a valid ticket is identified on first device 101. Furthermore, in an aspect, second device 107 can transmit (e.g., in an offline contactless manner, contact-based manner, or using an online networked technique) a command to first device 101 to reassign (e.g., using second transition component 210) flag data from corresponding with valid state data 183 (e.g., first state) to corresponding with in state data 187 (e.g., second state). In an aspect, a transmission of a command by second device 107 can represent a second validation event associated with the reassignment (e.g., using second transition component 210) of flag data. Furthermore, in response to the command, device 101 can reassign (e.g., using processor 112 to execute second transition component 210) flag data to correspond with in state data 187 representing that the smartcard has a valid token for the current event and that the smart card has entered the venue.

In another aspect, second transition component 210 can reassign flag data from in state data (e.g., first state data) to out state data 191 upon the occurrence of first device 101 exiting the event venue. In an aspect, second device 107 can transmit a command to first device 101 to employ second transmission component 210 to reassign flag data to out state data 191 upon validating that first device 101 has exited the event venue but may potentially re-enter the venue. Accordingly, first device 101 can utilize processor 112 to execute the demand received from second device 107. In an instance, out state data 191 can represent that ticket data stored on first device 101 is valid and that first device 101 exited the venue after entering the venue. Furthermore, in an aspect, second transition component 210 can reassign flag data from out state data 191 to in state data 187 representing that first device 101 has entered the event venue, exited the event venue, and entered the event venue once again.

In each instance flag data is reassigned (e.g., using second transition component 210), a validation event occurs between first device 101 and second device 107, where second device 107 either reads the data on first device 101 or transmits a command to first device 101 to assign (e.g., using first transition component 130) or reassign (e.g., using second transition component 210) flag data within the set of token data or a subset of token data. In another aspect, processor 114 can execute second transition component 210 to reassign flag data to invalid state data 189 representing that first device 101 (e.g., and the user possessing such first device 101) is ejected from the event venue. For instance, the user could violate a rule of the venue or cause a nuisance that warrants their ejection from the event.

In such instance, second device 107 can execute (e.g., using processor 114) second transition component 210 to transmit a command to first device 101 to reassign flag data to invalid state data 189. In another aspect, second transition component 210 can reassign flag data from no ticket state data 185 representing that first device 101 does not have valid token data (e.g., ticket data) for the event stored on first data store 102. In an aspect, the capability of system 200 and other system embodiments disclosed herein to facilitate a reassignment (e.g., using first transition component 130 and second transition component 210) of flag data to respective state data subsets can support the policies, rules, and requirements governing attendance at an event to be enforced. Furthermore, the transitioning and reassignment of flag data among various state data can be implemented in several scenarios using a smart card (e.g., first device 101) storing token data to track a user's activity life cycle in respective scenarios as well as enforce customized policies, rules, and requirements governing such activities.

Figure 3:
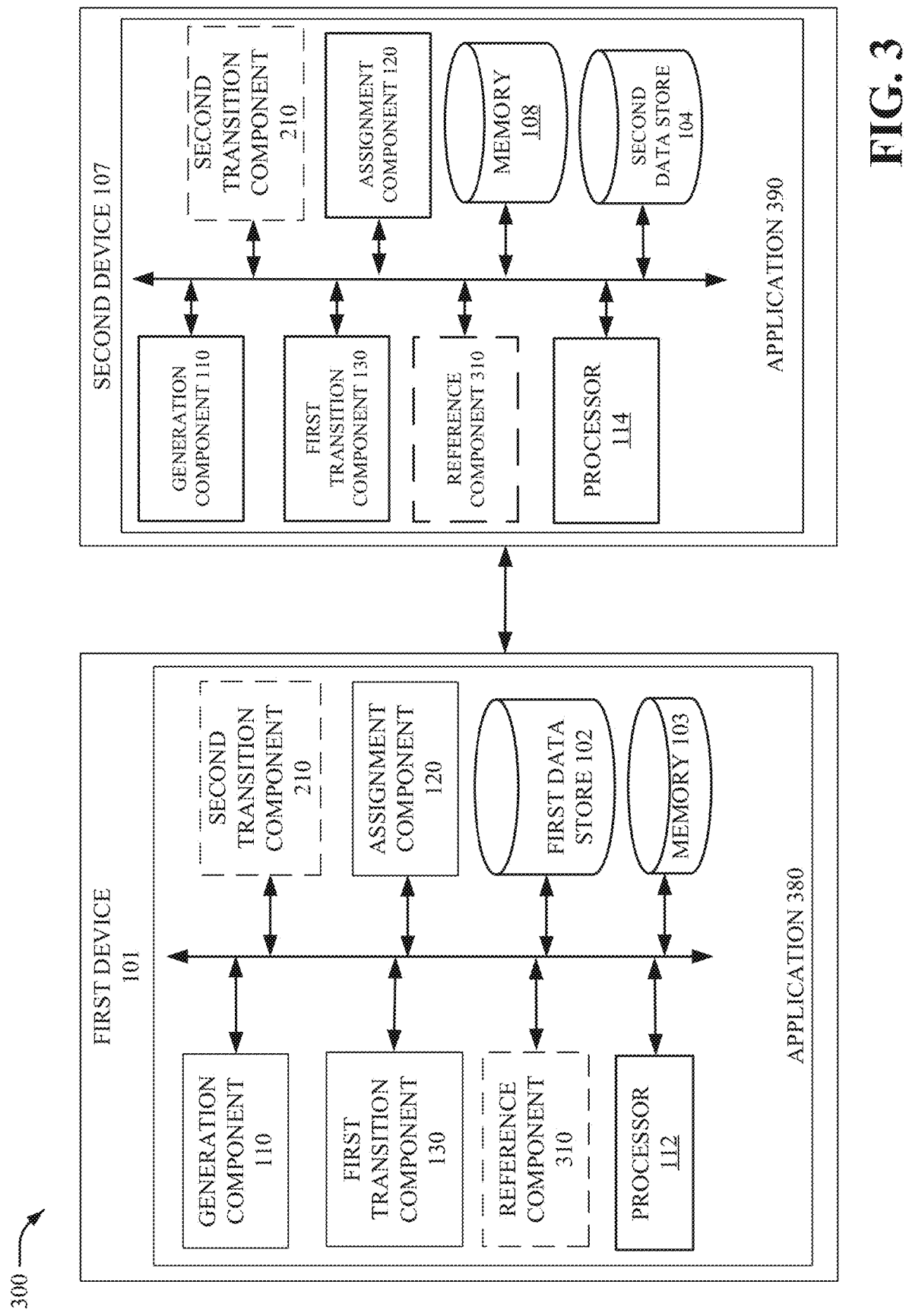
FIG. 3 illustrates a block diagram of an example, non-limiting system that can facilitate a generation of token data and compare event identification data and token data to known identification data and known token identification data in accordance with one or more embodiments described herein.

Turning now to FIG. 3, illustrated is a block diagram of an example, non-limiting system 300 that can facilitate a generation of token data and compare event identification data and token data to known identification data and known token identification data in accordance with one or more embodiments described herein. Repetitive description of like elements employed in other embodiments described herein is omitted for sake of brevity.

In an aspect, system 300 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 380 comprising generation component 110, assignment component 120, first transition component 130, second transition component 210, and/or first data store 102. In another aspect, first device 101 can comprise processor 112 and memory 103. In an aspect, processor 112 can execute the computer executable components and/or computer instructions stored in memory 103.

In another aspect, system 300 can also comprise second device 107 that can employ application 390 comprising generation component 110, assignment component 120, first transition component 130, second transition component 210, and/or second data store 104. In an aspect, second device 107 can comprise processor 114 and memory 108. In another aspect, processor 112 can execute the computer executable components and/or computer instructions stored in memory 108. In yet another aspect, one or more of the components of system 300 can be electrically and/or communicatively coupled to one or more devices of system 300 or other embodiments disclosed herein. Furthermore, in an aspect, system 300 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 3 but illustrated in FIG. 1B). Furthermore, in an aspect, system 300 can further comprise a reference component 310 within application 380 of first device 101 and/or application 390 of second device 107. In an aspect, one or more of the components of system 300 can be electrically and/or communicatively coupled to one or more devices of system 300 or other embodiments disclosed herein.

In an aspect, system 300 can employ a processor (e.g., processor 112 of first device 101, processor 114 of second device 107) to execute reference component 310 that compares, by the second device 107, the event identification data and the token data stored on the first data store 102 of the first device 101 to known event identification data and known token identification data stored on a second data store 104 of the second device 107. In an instance, one or more subsets of token data (e.g., ticket data) of the set of token data stored at first data store 102 of first device 101 can include one or more event identifier (e.g., also referred to as eventID). The event identifier can be a reference number, an alphanumeric code, a keyword, a tag, or any other such reference identifier. In an aspect, second device 107 can execute (e.g., using processor 114) instructions to read an event identifier (e.g., event identification data) stored at first data store 102 of first device 101.

Furthermore, second device 107 can execute (e.g., using processor 114) reference component 310 to compare the event identifier to a known event identifier (e.g., also referred to as known event identification data) stored at a second data store 104 of second device 107. Furthermore, in an aspect, the reference component 310 can evaluate the similarity of the event identification data the known event identification data. For instance, reference component 310 can evaluate whether there is an exact comparative match, partial comparative match, or no comparative match between the event identification data and the known event identification data. Furthermore, in an aspect, second device 107 can comprise (e.g., stored at second data store 104) a white list representing known event identification data permitted access to an event. In an aspect, second device 107 can execute reference component 310 to compare the event identification data to known event identification data that is part of a white list stored on second device 107.

Upon a comparative determination that a match exists between the event identification data stored on first device 101 and known event identification data stored on second device 107, then a determination can be made by second device 107 that first device 101 is entitled to a set of permissions associated with the event (e.g., rights to enter the venue, rights to exit the venue with re-entry permissions, rights to purchase merchandise using first device 101, etc.). In another aspect, second device 107 can store (e.g., at second data store 104) a black list of known event identifiers as well to determine a prohibition of first device 101 to enter particular events based on a comparative similarity between the event identification data and known event identification data corresponding to a blacklist stored on second device 107.

While event identification data can represent permission settings entitling first device 101 to rights associated with a particular event, first device 101 can also store token identification data (e.g., also referred to as a token ID). In an aspect, the token identification data can serve as another layer of authentication (e.g., aside from event identification data) where the token identification data represents an identifier of first device 101 itself. For example, token identification data can be encoded to a smart card (e.g., first device 101) hardware and software components. Accordingly, such token identification data can protect against users fabricating or falsifying smart cards with event identification data to gain access to an event or facilitating illegal "scalping" of smart cards storing event data. As such, second device 107 can compare a token identification data to known token identification data stored on a whitelist or a blacklist within a second data store of second device 107. Accordingly, a comparison can facilitate a determination (e.g., using validation component 410 disclosed below) as to whether a first device 101 is valid or invalid.

Figure 4:
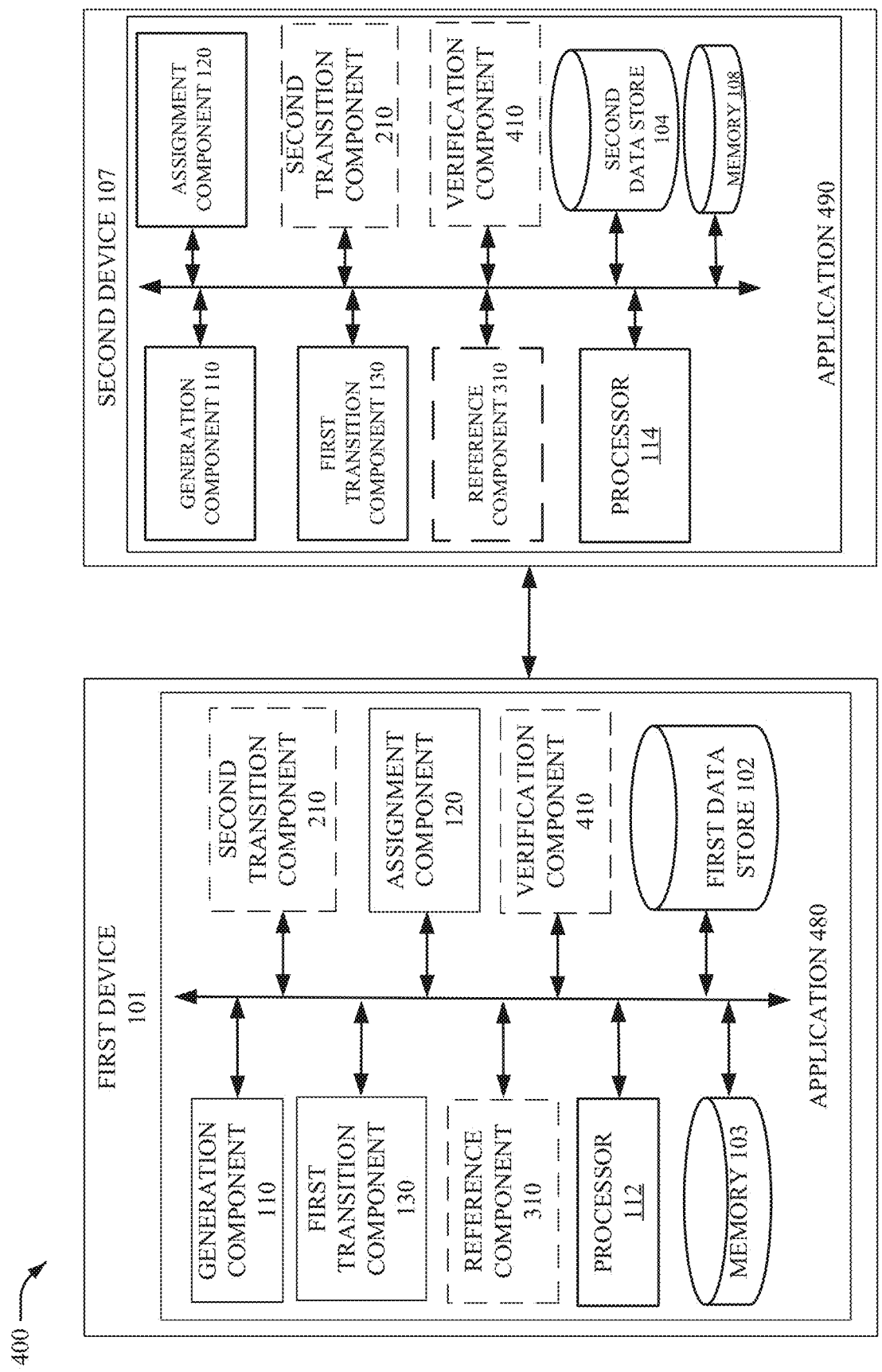
FIG. 4 illustrates a block diagram of an example, non-limiting system that can facilitate a generation of token data and verify that event identification data and token data is substantially similar to known event identification data and known token identification data respectively in accordance with one or more embodiments described herein.

Turning now to FIG. 4, illustrated is a block diagram of an example, non-limiting system 400 that can facilitate a generation of token data and verify that event identification data and token data is substantially similar to known event identification data and known token identification data respectively in accordance with one or more embodiments described herein. Repetitive description of like elements employed in other embodiments described herein is omitted for sake of brevity.

In an aspect, system 400 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 480 comprising generation component 110, assignment component 120, first transition component 130, second transition component 210, reference component 310, and/or first data store 102. In another aspect, first device 101 can comprise processor 112 and memory 103. In an aspect, processor 112 can execute the computer executable components and/or computer instructions stored in memory 103.

In another aspect, system 400 can also comprise second device 107 that can employ application 490 comprising generation component 110, assignment component 120, first transition component 130, second transition component 210, reference component 310, and/or second data store 104. In an aspect, second device 107 can comprise processor 114 and memory 108. In another aspect, processor 112 can execute the computer executable components and/or computer instructions stored in memory 108. In yet another aspect, one or more of the components of system 400 can be electrically and/or communicatively coupled to one or more devices of system 400 or other embodiments disclosed herein. Furthermore, in an aspect, system 400 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 4 but illustrated in FIG. 1B). Furthermore, in an aspect, system 400 can further comprise a verification component 410 within application 480 of first device 101 and/or application 490 of second device 107. In an aspect, one or more of the components of system 400 can be electrically and/or communicatively coupled to one or more devices of system 400 or other embodiments disclosed herein.

In an aspect, system 400 can employ a processor (e.g., processor 112 of first device 101, processor 114 of second device 107) to execute verification component 410 that verifies, by the second device 107, that the event identification data and the token data are substantially similar to the known event identification data and the known token identification data respectively, based on a comparison of the event identification data and the token data to the known event identification data and the known token identification data. Accordingly, processor 114 of second device 107 can execute verification component 410 to verify that the event identification data on first device 101 is valid and authorizes first device 101 to participate in a particular event. Furthermore, verification component 410 can also validate whether first device 101 itself is valid based on a similarity of token identification data.

In an aspect, processor 114 can execute reference component 310 to compare the similarity of subsets of token data (e.g., event identification data, known event identification data, token identification data, known identification data). Furthermore, processor 114 can execute assignment component 120 in connection with reference component 310 to assign a score to respective subsets of token data based on a determined similarity between such token data subsets. Accordingly, processor 114 can execute verification component 410 to verify the similarity and/or validity of respective subsets of token data (e.g., event identification data, token identification data) stored on first device 101 based on a comparison of the (similarity) score to a threshold score.

For instance, verification component 410 can verify that two subsets of token data are substantially similar based on whether the score is greater than a threshold score. Thus, if a similarity score assigned to a subset of event identification data and a subset of known event identification data is greater than a threshold score then the two data subsets may me deemed valid by second device 107. Similarly, if the similarity score is below a threshold score, then the subsets of data can be deemed invalid. As such, an operator of second device 107 may choose to disallow a holder of first device 101 or permit a holder of first device 101 to perform an activity (e.g., enter an event venue) based on a determined validity or invalidity of respective subsets of token data.

In another aspect, processor 114 of second device 107 can execute verification component 410 in connection with first transition component 130 and/or second transition component 210. For instance, verification component 410 can determine a first device 101 to store a valid set (or subset) of token data based on the the binding of token data to valid token identification data determined to be sufficiently similar to known token identification data stored on a white list of second device 107. Accordingly, based on a determination of validity (e.g., using verification component 410 in connection with reference component 310) of the token data, second device 107 can execute instructions to reassign (e.g., using first transition component 130) flag data from no state data 181 (e.g., representing no token record of the current event is present on a smart card) of first device 101 to valid state data 183 (e.g., representing that the smart card has a valid token for the current event and that the holder of the smart card has never entered the venue). In this non-limiting example scenario, first device 101 is being read for the first time by second device 107 and the possessor of first device 101 has not yet entered the event venue.

In another instance, processor 114 of second device 107 can execute the verification component 410 in connection with second transition component 210 to verify the validity of token data and reassign flag data stored on first device 101 from valid state data 183 to an in state data 187. Thus second device 107 determines that first device 101 has a valid token bound to the valid token identification data (e.g., validity determined based on a similarity determination with known token identification data stored on a white list at second device 107). Furthermore, in an aspect, such scenario can presume that first transition component 130 already transitioned flag data from no state data 181 to valid state data 183. In a similar aspect, first device 101 is read by second device 107 for the first time and a determination that first device 101 has a valid token is verified (e.g., using verification component 410). Furthermore, flag data stored on a smart card (e.g., first device 101) can be reassigned (e.g., using first transition component 130) from an original assignment (e.g., using assignment component 120) of flag data corresponding to no state data 181 to the flag data now corresponding to in state data 187. In such instance, a smartcard (first device 101) can be read by a validation terminal (e.g., second device 107) for the first time and the holder (e.g., user owner, possessor) of first device 101 enters the event venue.

In several other aspects, processor 114 can execute verification component 410 in connection with first transition component 130 and/or second transition component 210 to assign flag data from no state data 187 to no ticket state data 185, from no ticket state data 185 to valid state data 183, from no ticket state data 185 to in state data 187, from valid state data 183 and out state data 191 to in state data 187, from in state data 187 to out state data 191, from in state data 187 and out state data 191 to invalid state data 189. In an aspect, a reassignment (e.g., using first transition component 130) of flag data from no state data 187 to no ticket state data 185 can indicate that a validation terminal (e.g., second device 107) does not store a valid known token identification data that is similar to the token identification data stored on first device 101. Furthermore, the smart card (e.g., first device 101) with no token record is presented to the validation terminal (e.g., second device 107) for the first time.

In an aspect, a reassignment (e.g., using first transition component 130) of flag data from no ticket state data 185 to valid state data 183 can indicate that a validation terminal (e.g., second device 107) stored ticket data on the smart card (e.g., first device 101) after a cut-off time potentially due to the purchasing/selling of the ticket after such cut-off time. In another aspect, a reassignment (e.g., using first transition component 130) of flag data from no ticket state data 185 to in state data 187 can indicate that a validation terminal (e.g., second device 107) stored ticket data on the smart card (e.g., first device 101) after a cut-off time potentially due to the purchasing/selling of the ticket after such cut-off time and that the smart card (e.g., first device 101) entered the event venue.

Also, in an aspect, a reassignment (e.g., using second transition component 210) of flag data from valid state data 183 or out state data 191 to in state data 187 can indicate that the smart card (e.g., first device 101) entered the event venue. For instance, the smart card (e.g., first device 101) at this stage could have been read by one or more validation terminal (e.g., second device 107) to have ticket data stored on the smart card be determined as valid, to be allowed inside the venue, to have exited the event venue, and currently to attempt to gain access to the event venue once again. Furthermore, in an aspect, a reassignment (e.g., using second transition component 210) of flag data from in state data 187 to out state data 191 can indicate that the smart card (e.g., first device 101) exited the event venue.

In yet another aspect, a reassignment (e.g., using second transition component 210) of flag data from valid state data 183 and out state data 191 to in state data 187 or out state data 191 to invalid state data 189 can indicate that the smart card (e.g., first device 101) or holder of the smart card is ejected from the venue and not permitted to re-enter the venue (e.g., permissions and authorizations are revoked). Accordingly, verification component 410 can facilitate a validation and/or verifying of token data as well as transitioning states associated with token data stored on a smart card (e.g., first device 101). As such, execution of verification component 410 can facilitate managing a work flow of the token through various transitional stages of a token life cycle.

Figure 5:
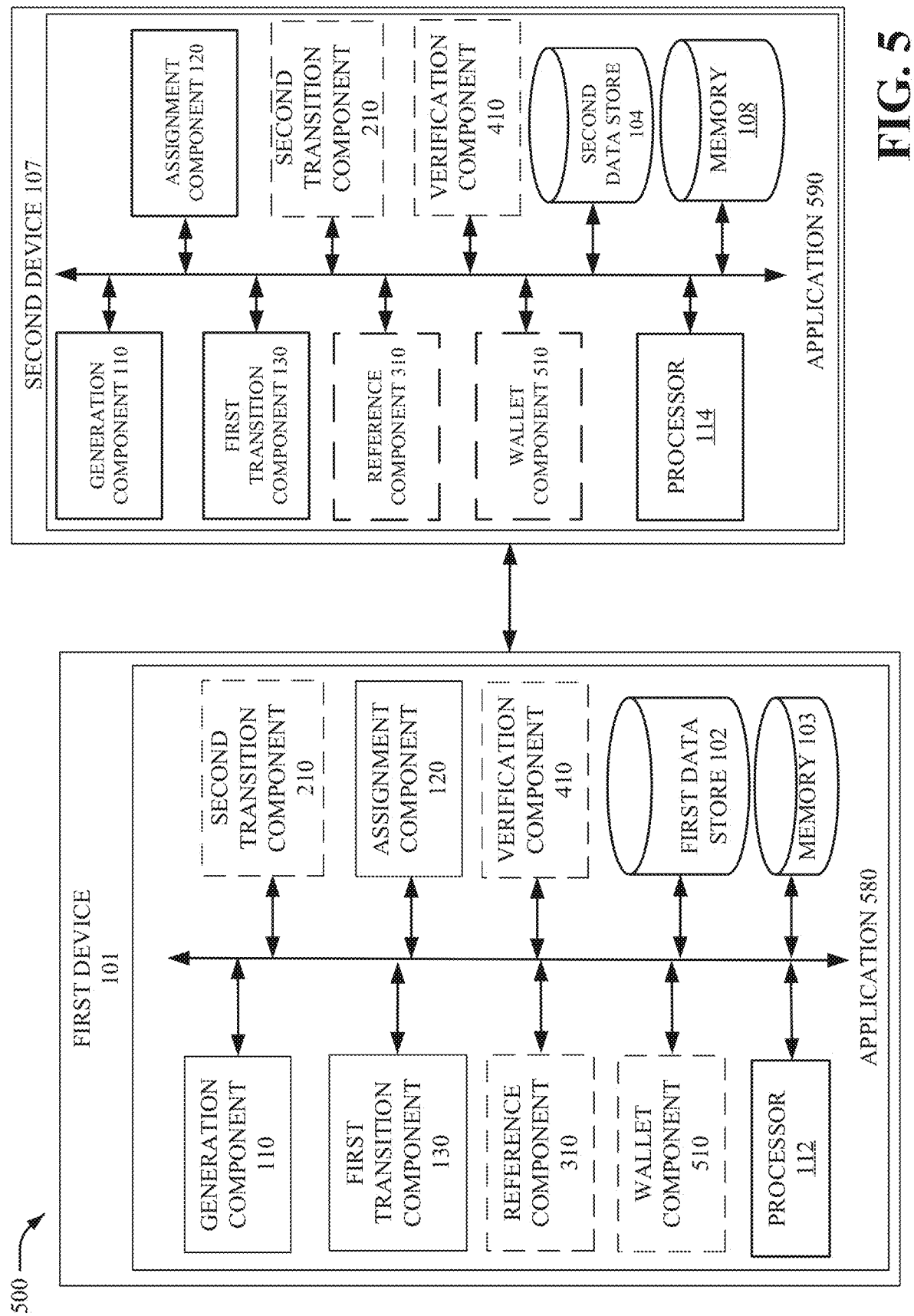
FIG. 5 illustrates a block diagram of an example, non-limiting system that can facilitate a generation of token data and a generation of payment data for storage at a first data store in accordance with one or more embodiments described herein.

Turning now to FIG. 5, illustrates a block diagram of an example, non-limiting system 500 that can facilitate a generation of token data and a generation of payment data for storage at a first data store in accordance with one or more embodiments described herein. Repetitive description of like elements employed in other embodiments described herein is omitted for sake of brevity.

In an aspect, system 500 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 580 comprising generation component 110, assignment component 120, first transition component 130, second transition component 210, reference component 310, verification component 410 and/or first data store 102. In another aspect, first device 101 can comprise processor 112 and memory 103. In an aspect, processor 112 can execute the computer executable components and/or computer instructions stored in memory 103.

In another aspect, system 500 can also comprise second device 107 that can employ application 590 comprising generation component 110, assignment component 120, first transition component 130, second transition component 210, reference component 310, verification component 410 and/ or second data store 104. In an aspect, second device 107 can comprise processor 114 and memory 108. In another aspect, processor 112 can execute the computer executable components and/or computer instructions stored in memory 108. In yet another aspect, one or more of the components of system 500 can be electrically and/or communicatively coupled to one or more devices of system 500 or other embodiments disclosed herein. Furthermore, in an aspect, system 500 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 5 but illustrated in FIG. 1B). Furthermore, in an aspect, system 500 can further comprise a wallet component 510 within application 580 of first device 101 and/or application 590 of second device 107. In an aspect, one or more of the components of system 500 can be electrically and/or communicatively coupled to one or more devices of system 500 or other embodiments disclosed herein.

In an aspect, system 500 can employ a processor (e.g., processor 112 of first device 101, processor 114 of second device 107) to execute wallet component 510 that generates a set of payment data for storage at the first data store 102 of the first device 101, wherein the payment data represents an authorized monetary value associated with a payment instrument. In an aspect, first device 101 (e.g., smart card) can store system components and data associated with a digital wallet. The digital wallet can commence with a zero balance and the balance can be adjusted (e.g., using adjustment component 610) upward or downward as further described below. In an aspect, in any one or more of the embodiments disclosed herein (systems 100-1200), the several system embodiments can execute the one or more system components on one or more system devices in a fully offline mode. Accordingly, each terminal device (e.g., second device 107) is capable of modifying, storing, or altering data stored on one or more smart card (e.g., first device 101) without being connected to an online server device.

In an aspect, payment data can refer to data associated with a stored balance on first data store 102 of first device 101, data associated with an increase or decrease in the stored balance, data associated with a transfer of a monetary value corresponding to an acquisition of goods and/or services, and any other representation of an exchange of monetary value. As a non-limiting example, second device 107 can execute wallet component 510 to store a value on a smart card (e.g., first device 101). The value can represent a monetary amount that is pre-authorized (e.g., not yet charged to a credit card of the user of first device 101) or charged to a money account (e.g., credit card, bank, etc.) linked to first device 101. In the pre-authorization scenario, a credit card company can authorize first device 101 to execute components that incur transactions requiring a transfer of value up to the preauthorized value. The credit card will actually be charged the monetary amount at a subsequent time (e.g., after the event occurs and when the data is transferred from a first device 101 and/or second device 107 to an online payment system or server).

As an example, first device 101 can execute (e.g., using processor 112) generation component 110 to generate ticket data which is stored at first data store 101. Furthermore, first device 101 can receive instructions from second device 107 to generate payment data (e.g., by executing generation component 110 and wallet component 510). Accordingly, first device 101 is loaded with a pre-authorized value to spend on one or more transaction using first device 101.

After executing several transactions, first device 101 can can receive a final receipt data corresponding to all transactions incurred and all payment data adjustments incurred in association with such transactions. At such time, all payment data is stored on first device 101 and/or second device 107 in an offline environment. However, after the event is complete and closed, maintenance can be performed on second device 107 and/or first device 101 and one or more such devices can be networked in an online network environment to a server. Accordingly, the pre-authorization window for first device 101 can be closed and all transactions stored on first device 101 and second device 107 can be replicated between one or more other validation devices, smart card devices, and/or terminals.

Figure 6:
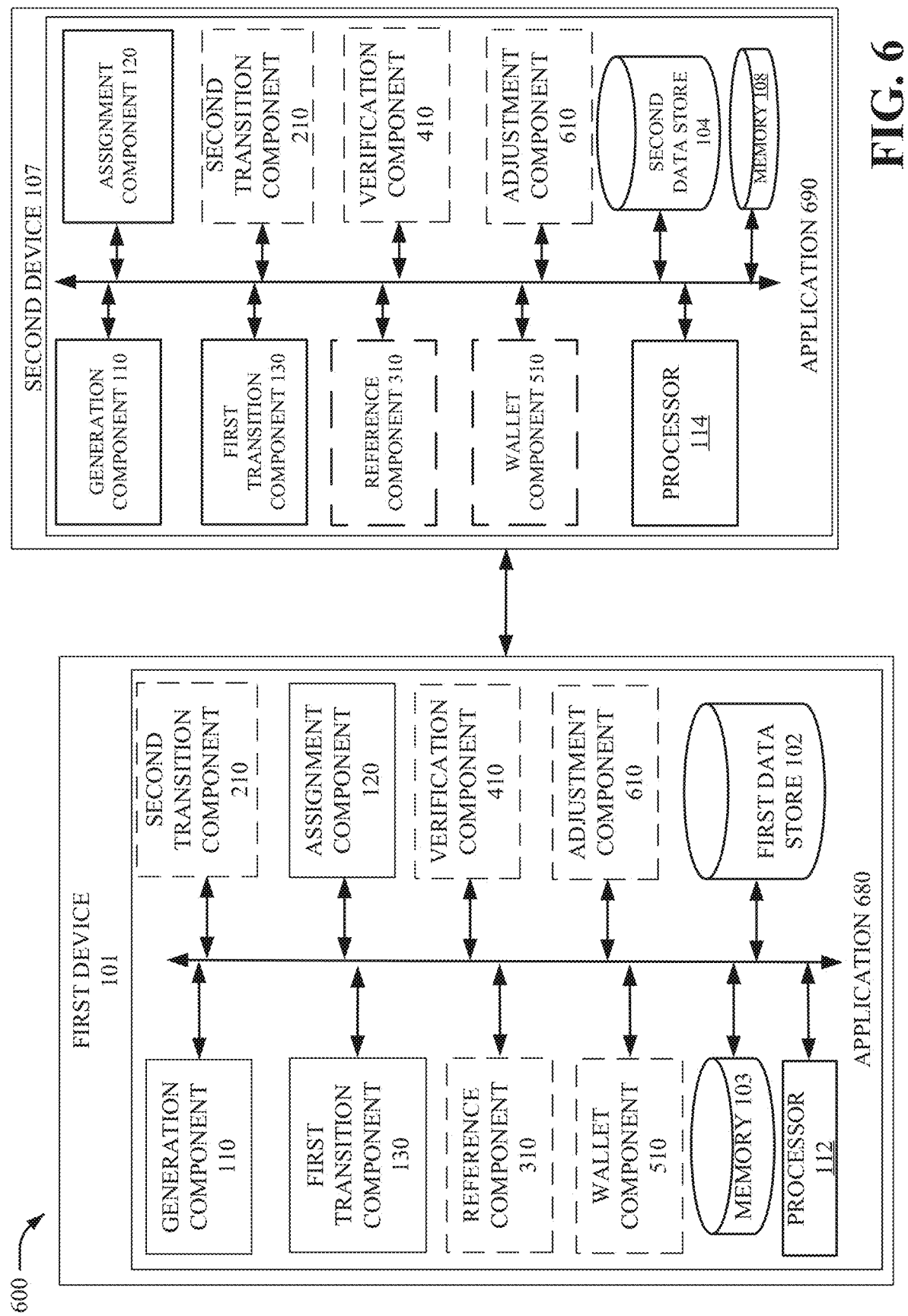
FIG. 6 illustrates a block diagram of an example, non-limiting system that can facilitate a generation of token data and a modification of a set of payment data in accordance with one or more embodiments described herein.

Turning now to FIG. 6, illustrated is a block diagram of an example, non-limiting system 600 that can facilitate a generation of token data and a modification of a set of payment data in accordance with one or more embodiments described herein. Repetitive description of like elements employed in other embodiments described herein is omitted for sake of brevity.

In an aspect, system 600 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 680 comprising generation component 110, assignment component 120, first transition component 130, second transition component 210, reference component 310, verification component 410, wallet component 510 and/or first data store 102. In another aspect, first device 101 can comprise processor 112 and memory 103. In an aspect, processor 112 can execute the computer executable components and/or computer instructions stored in memory 103.

In another aspect, system 600 can also comprise second device 107 that can employ application 690 comprising generation component 110, assignment component 120, first transition component 130, second transition component 210, reference component 310, verification component 410, wallet component 510 and/or second data store 104. In an aspect, second device 107 can comprise processor 114 and memory 108. In another aspect, processor 112 can execute the computer executable components and/or computer instructions stored in memory 108. In yet another aspect, one or more of the components of system 600 can be electrically and/or communicatively coupled to one or more devices of system 600 or other embodiments disclosed herein. Furthermore, in an aspect, system 600 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 6 but illustrated in FIG. 1B). Furthermore, in an aspect, system 600 can further comprise an adjustment component 610 within application 680 of first device 101 and/or application 690 of second device 107. In an aspect, one or more of the components of system 600 can be electrically and/or communicatively coupled to one or more devices of system 600 or other embodiments disclosed herein.

In an aspect, system 600 can employ a processor (e.g., processor 112 of first device 101, processor 114 of second device 107) to execute an adjustment component 610 that modifies the set of payment data to represent an increase or decrease in the authorized monetary value. In an aspect, while wallet component 510 can generate payment data for storage at first data store 102 of first device 101, adjustment component 610 can be executed to increase or decrease a value associated with the stored payment data on first device 101. For instance, upon a purchase of a drink, second device 107 can execute (e.g., using processor 114) adjustment component 610 to transmit instructions to first device 101 that decreases (e.g., a sale event) a balance value represented by a modification of payment data, to indicate the occurrence of the drink purchase transaction. In another instance, upon a refund, approval of an increase in a pre-authorized amount, and/or a deposit of additional funds represented by payment data, second device 107 can execute (e.g., using processor 114) adjustment component 610 to transmit instructions to first device 101 to increase (e.g., a top up event) a balance value represented by a modification of payment data, to indicate the occurrence of a refund, increased pre-authorization amount, or deposit of funds corresponding to first device 101.

As described above, processor 114 of second device 107 can execute instructions (e.g., using wallet component 510) for transmission to first device 101 to generate and/or store a value balance on first device 101, in which the value balance represents a digital wallet to be used in connection with purchases and other such transactions using first device 101. Furthermore, in accordance with one or more of the embodiments described herein, second device 107 is also capable of storing and/or modifying token data, payment data, transaction data, log data, and other such data at second data store on second device 107. For instance, a smart card (e.g., first device 101) that stores a value balance (e.g., payment data for purchases) at first data store 102 can have the value balance altered, adjusted and/or modified (e.g., using an adjustment component 610) upon first device 101 executing a purchase task (e.g., an operation that transfers money in association with receiving a good or service).

Accordingly, in an aspect, log data associated with the purchase transaction and that corresponds to a modification of payment data (e.g., a change in a value balance stored on first device 101) may not be able to be stored on first device 101 (e.g., due to storage limits of first data store 102). As such, the log data corresponding to the transaction can be stored at a second data store on second device 107 (e.g., a computer terminal, a validation terminal, etc.). Furthermore, a first device 101 can store a last transaction (e.g., last transaction data), or several last transactions (e.g., a set of last transaction data) corresponding to one or more transactions respectively in accordance with the storage capacity of first data store 102 of first device 101 and transaction speed limitations or speed requirements of first device 101.

Figure 7:
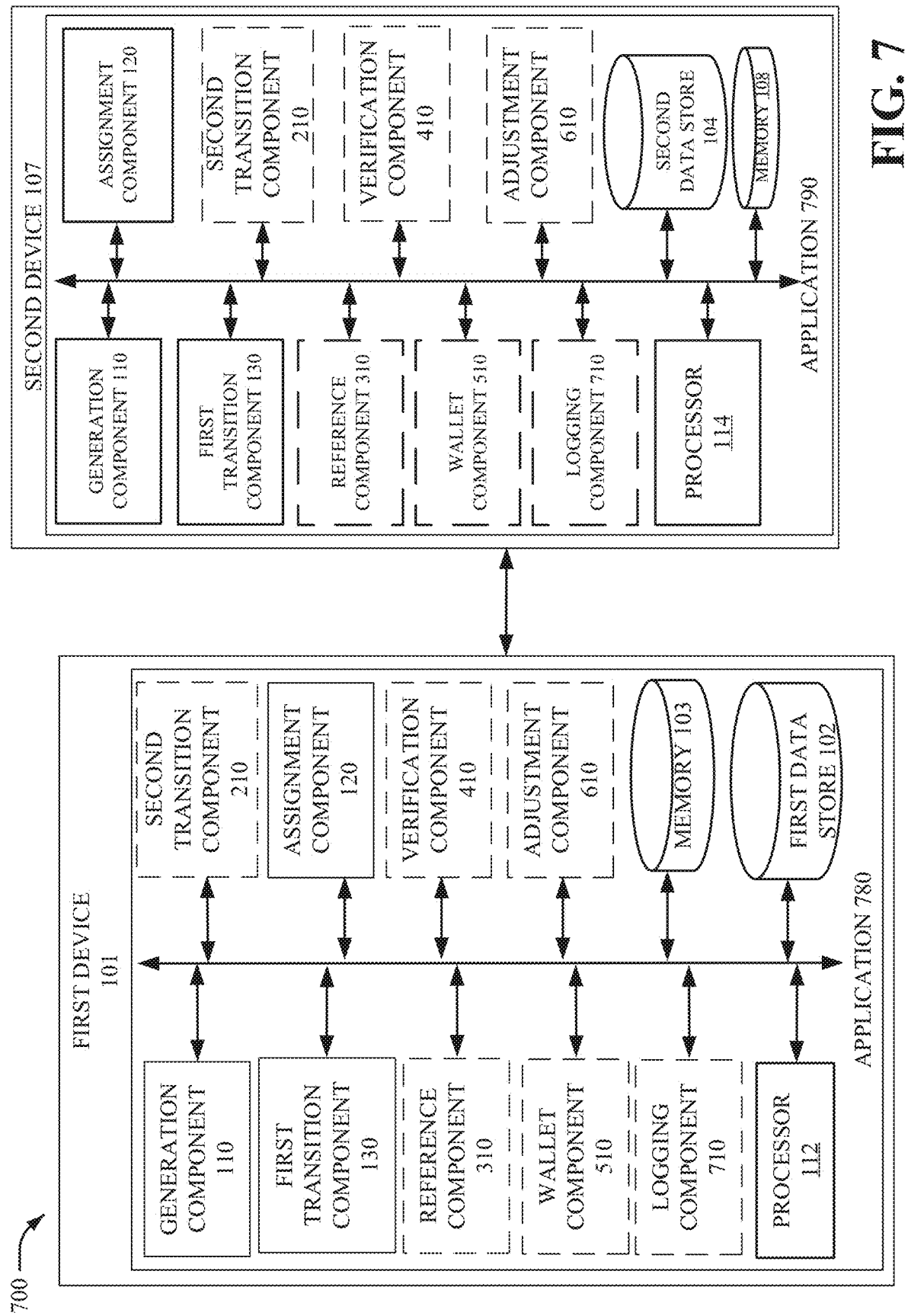
FIG. 7 illustrates a block diagram of an example, non-limiting system that can facilitate a generation of token data and a generation of log data in accordance with one or more embodiments described herein.

Turning now to FIG. 7, illustrated is a block diagram of an example, non-limiting system 700 that can facilitate a generation of token data and a generation of log data in accordance with one or more embodiments described herein. Repetitive description of like elements employed in other embodiments described herein is omitted for sake of brevity.

In an aspect, system 700 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 780 comprising generation component 110, assignment component 120, first transition component 130, second transition component 210, reference component 310, verification component 410, wallet component 510, adjustment component 610 and/or first data store 102. In another aspect, first device 101 can comprise processor 112 and memory 103. In an aspect, processor 112 can execute the computer executable components and/or computer instructions stored in memory 103.

In another aspect, system 700 can also comprise second device 107 that can employ application 790 comprising generation component 110, assignment component 120, first transition component 130, second transition component 210, reference component 310, verification component 410, wallet component 510, adjustment component 610, and/or second data store 104. In an aspect, second device 107 can comprise processor 114 and memory 108. In another aspect, processor 112 can execute the computer executable components and/or computer instructions stored in memory 108. In yet another aspect, one or more of the components of system 700 can be electrically and/or communicatively coupled to one or more devices of system 700 or other embodiments disclosed herein. Furthermore, in an aspect, system 700 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 7 but illustrated in FIG. 1B). Furthermore, in an aspect, system 700 can further comprise a logging component 710 within application 780 of first device 101 and/or application 790 of second device 107. In an aspect, one or more of the components of system 700 can be electrically and/or communicatively coupled to one or more devices of system 700 or other embodiments disclosed herein.

In an aspect, system 700 can employ a processor (e.g., processor 112 of first device 101 and/or processor 114 of second device 107) to execute a logging component 710 that generates log data associated with the first validation event or one or more transactional events. In accordance with one or more non-limiting system embodiments described herein, first device 101 can execute a logging component 710 that generates log data associated with transactional events. In an aspect, log data can correspond to the following; a date and time-stamp event (e.g., date and/or time of purchasing ticket data for an event, entering an event, exiting event, incurring a purchase at an event, updating data stored on first device 101, etc.), identifying information of a terminal (e.g., second device 107) used for validating a transaction (e.g., a terminal number, a terminal location, identification information regarding the operator of the terminal, etc.), identifying information of the user logged into the terminal, identifying information of the smart card (e.g., first device 101 serial number, issuance date, operating system, etc.), transaction type (e.g., purchase, sale, operational task conducted, increase in digital wallet balance value, decrease in digital wallet balance value, etc.), transaction status (e.g., transaction initiated, pending, closed, etc.), state of the smart card (e.g., first device 101) prior to the transaction (e.g., status of first device 101, state of data stored on first device 101, storage capacity prior to transaction, etc.), state of smart card after the transaction (e.g., status of first device 101 after the transaction, state of data stored on first device 101 after the transaction, storage capacity after transaction occurred, etc.).

In an aspect, second device 107 and/or first device 101 can generate and/or store log data upon the occurrence of a transactional event. The log data can be stored on the smart card of one or more validation terminal (e.g., second device 107). In an offline environment, the log data can be synchronized (e.g., uploaded) to a server device at a later time (e.g., after an event has concluded). As such, system 700 and other system embodiments disclosed herein can be employed in an offline environment (e.g., terminals and smart cards communicate offline during the event) and an online environment (e.g., terminals, smart cards, communicate with server devices and each other in an online environment after the event). However, to mitigate any risk of lost, stolen, and/or vandalized data stored on first device 101 and second device 107 while operating in an offline environment, data replication components (e.g., described below) can be employed by such devices in order to transfer log data, payment data, state data, token data, and other such data types to other terminals and smart cards for backup records.

Figure 8:
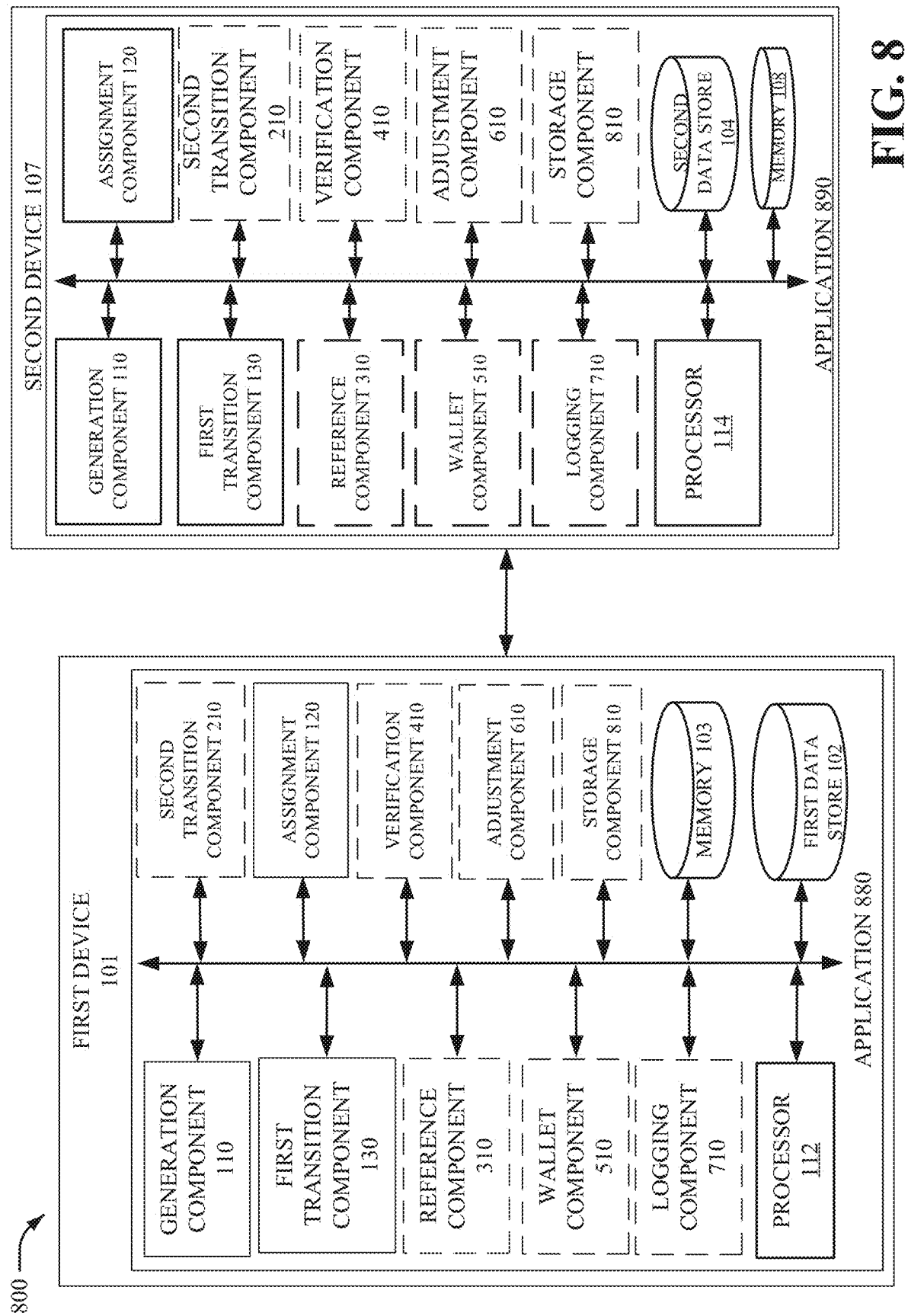
FIG. 8 illustrates a block diagram of an example, non-limiting system that can facilitate a generation of token data and a storage of a set of token data at a first data store in accordance with one or more embodiments described herein.

Turning now to FIG. 8, illustrated is a detection component 810 that facilitates a detection, by the second device, of the first device in an offline network environment based on one or more authentication technologies. Repetitive description of like elements employed in other embodiments described herein is omitted for sake of brevity.

In an aspect, system 800 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 880 comprising generation component 110, assignment component 120, first transition component 130, second transition component 210, reference component 310, verification component 410, wallet component 510, adjustment component 610, logging component 710, and/or first data store 102. In another aspect, first device 101 can comprise processor 112 and memory 103. In an aspect, processor 112 can execute the computer executable components and/or computer instructions stored in memory 103.

In another aspect, system 800 can also comprise second device 107 that can employ application 890 comprising generation component 110, assignment component 120, first transition component 130, second transition component 210, reference component 310, verification component 410, wallet component 510, adjustment component 610, logging component 710, and/or second data store 104. In an aspect, second device 107 can comprise processor 114 and memory 108. In another aspect, processor 112 can execute the computer executable components and/or computer instructions stored in memory 108. In yet another aspect, one or more of the components of system 800 can be electrically and/or communicatively coupled to one or more devices of system 800 or other embodiments disclosed herein. Furthermore, in an aspect, system 800 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 8 but illustrated in FIG. 1B). Furthermore, in an aspect, system 800 can further comprise a storage component 810 within application 880 of first device 101 and/or application 890 of second device 107. In an aspect, one or more of the components of system 800 can be electrically and/or communicatively coupled to one or more devices of system 800 or other embodiments disclosed herein.

In an aspect, system 800 can employ a processor (e.g., processor 112 of first device 101 and/or processor 114 of second device 107) to execute a storage component 810 that stores the set of token data for storage at a first data store 102 of a first device 101. In an aspect, first device 101 can execute storage component 810 to facilitate a storage of a range of data types at first data store 102. For instance, upon generation (e.g., using generation component 110) of a set of token data, assignment (e.g., using assignment component 120) of flag data to a subset of state data, reassignment (e.g., using first transition component 110 and/or second transition component 210) of flag data to another subset of state data, comparison (e.g., using reference component 310) of subsets of data (e.g., event identification data to known event identification data, token identification data to known token identification data), a generation (e.g., using wallet component 510) of payment data, a modification (e.g., using adjustment component 610) of payment data, a generation (e.g., using logging component 710) of log data, and other such data generation, assignment, and/or modification tasks, storage component 810 can be employed to facilitate the storage of data in respective devices.

In an aspect, processor 112 can execute storage component 810 to facilitate storage of data at first data store 102 of first device 101. In another aspect, processor 114 can execute storage component 810 to facilitate storage of data at a second data store of second device 107. In another aspect, processor 114 of second device 107 can execute instructions to first device 101 to employ storage component 810 to store data in a more efficient manner and in association with efficient access patterns. Similarly, in an aspect, processor 114 of second device 107 can execute instructions to device 108 to employ storage component 810 to store data at second data store of second device 107 in various instances, such as reading that storage capacities of first device 101 are close to full. In yet another aspect, storage component 810 can facilitate an organized storage mechanism to allow for easier access (e.g., using organized storage patterns) and look-up capabilities of data. As such, storage component 810 can facilitate and further efficiently enable subsets of token data to transition to data states that represent a range of status's of the subset of token data (e.g., pursuant to a token activity or lifecycle) within first device 101 and/or second device 107.

Figure 9:
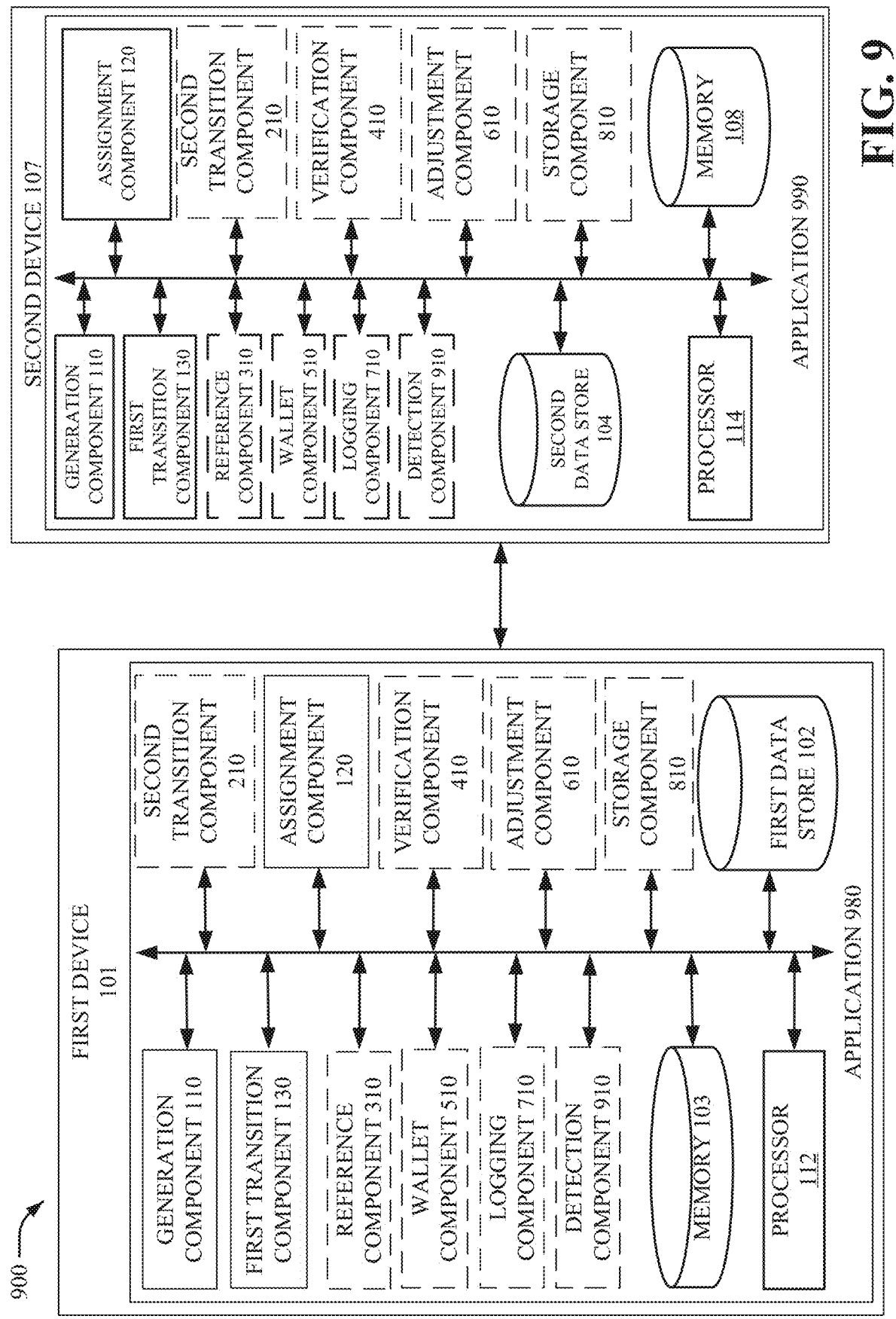
FIG. 9 illustrates a block diagram of an example, non-limiting system that can facilitate a generation of token data and a detection of a first device in an offline network environment in accordance with one or more embodiments described herein.

Turning now to FIG. 9, illustrated is a block diagram of an example, non-limiting system 900 that can facilitate a generation of token data and a detection of a first device in an offline network environment in accordance with one or more embodiments described herein. Repetitive description of like elements employed in other embodiments described herein is omitted for sake of brevity.

In an aspect, system 900 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 980 comprising generation component 110, assignment component 120, first transition component 130, second transition component 210, reference component 310, verification component 410, wallet component 510, adjustment component 610, logging component 710, storage component 810, and/or first data store 102. In another aspect, first device 101 can comprise processor 112 and memory 103. In an aspect, processor 112 can execute the computer executable components and/or computer instructions stored in memory 103.

In another aspect, system 900 can also comprise second device 107 that can employ application 990 comprising generation component 110, assignment component 120, first transition component 130, second transition component 210, reference component 310, verification component 410, wallet component 510, adjustment component 610, logging component 710, storage component 810, and/or second data store 104. In an aspect, second device 107 can comprise processor 114 and memory 108. In another aspect, processor 112 can execute the computer executable components and/or computer instructions stored in memory 108. In yet another aspect, one or more of the components of system 900 can be electrically and/or communicatively coupled to one or more devices of system 900 or other embodiments disclosed herein. Furthermore, in an aspect, system 900 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 9 but illustrated in FIG. 1B). Furthermore, in an aspect, system 900 can further comprise a detection component 910 within application 980 of first device 101 and/or application 990 of second device 107. In an aspect, one or more of the components of system 900 can be electrically and/or communicatively coupled to one or more devices of system 900 or other embodiments disclosed herein.

In an aspect, system 900 can employ a processor (e.g., processor 112 of first device 101 and/or processor 114 of second device 107) to execute a detection component 910 that facilitates a detection, by the second device 107, of the first first device 101 in an offline network environment based on one or more authentication technologies. In an aspect, systems, methods, and/or devices disclosed herein can employ contactless payment mechanisms that require no physical contact between devices to effectuate a transaction. For instance, processor 114 of second device 107 can execute detection component 910 to detect the presence of first device 101 and communicate (e.g., read, access, and/or transmit commands, instructions, and/or data) with first device 101. In an aspect, detection component 910 can utilize radio frequency technologies that support a range of security capabilities.

In another aspect, detection component 910 can be employed in connection with other system components to execute the following communications tasks (e.g., that require detection of first device 101 by second device 107 and/or second device 107 by first device 101) including, but not limited to: generating (e.g., using generation component 110) a set of token data, assigning (e.g., using assignment component 120) flag data to a subset of state data, reassigning (e.g., using first transition component 110 and/or second transition component 210) flag data to another subset of state data, comparing (e.g., using reference component 310) subsets of data (e.g., event identification data to known event identification data, token identification data to known token identification data) between first device 101 and second device 107, verifying (e.g., using verification component 410) that subsets of data between first device 101 and second device 107 are sufficiently similar, generating (e.g., using wallet component 510) payment data, modifying (e.g., using adjustment component 610) payment data, a generating (e.g., using logging component 710) log data, facilitating a storage (e.g., using storage component 810) of data between one or more device can be employed to facilitate the storage of data in respective devices and other such tasks utilizing device detection capabilities. As such, detection component 910 is executed by processor 112 and/or processor 114 to detect one or more device and effectuate tasks, operations, and/or activities conducted between first device 101 and second device 107.

Figure 10:
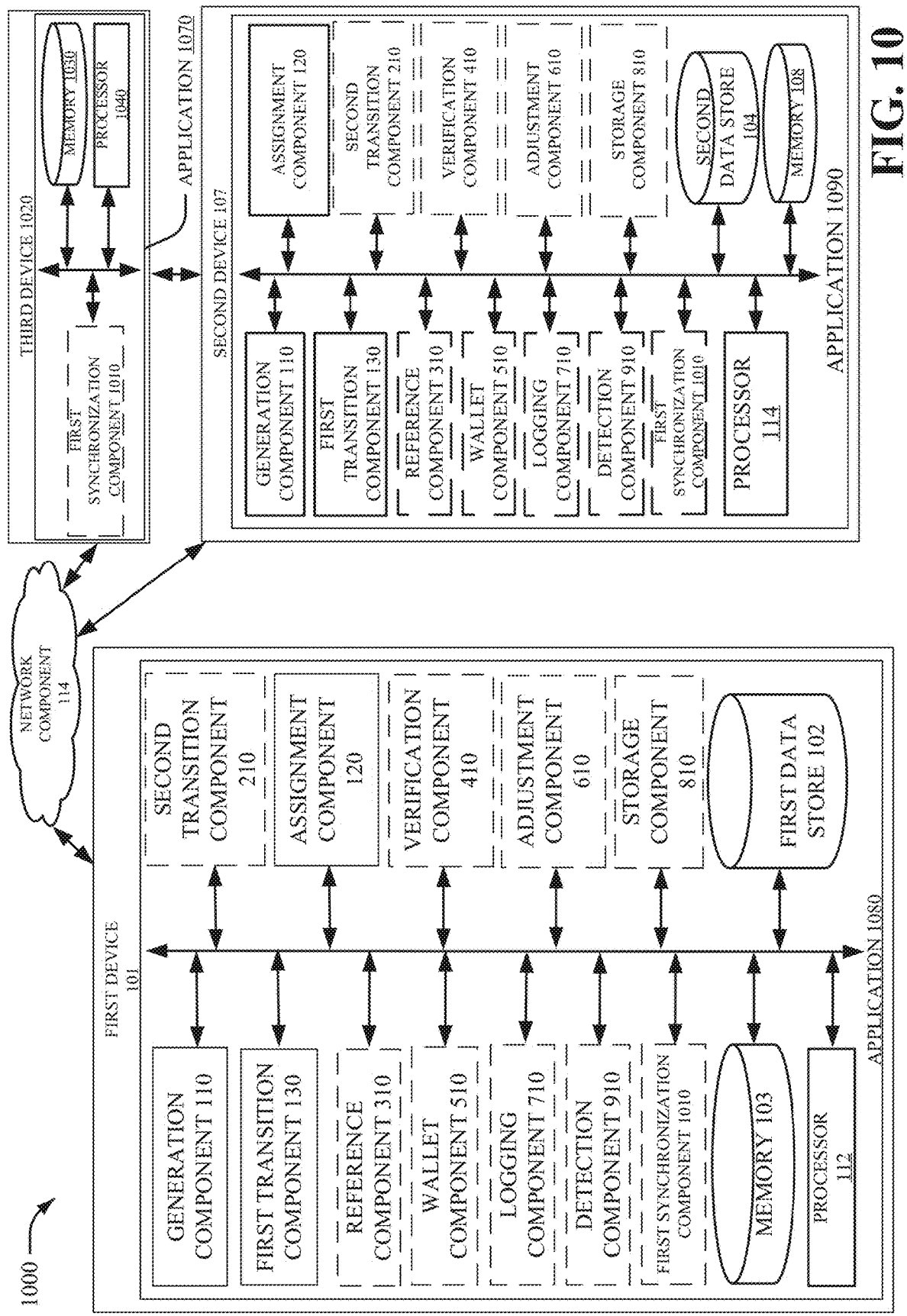
FIG. 10 illustrates a block diagram of an example, non-limiting system that can facilitate a generation of token data and a synchronization of first log data stored on a second data store in accordance with one or more embodiments described herein.

Turning now to FIG. 10, illustrated is a block diagram of an example, non-limiting system 1000 that facilitate a generation of token data and a synchronization of first log data stored on a second data store in accordance with one or more embodiments described herein. Repetitive description of like elements employed in other embodiments described herein is omitted for sake of brevity.

In an aspect, system 1000 can comprise first device 101 and second device 107 that can communicate (via an online network (e.g., network component 114 introduced in FIG. 10) or a contactless offline mechanism (e.g., RFID, Bluetooth®, etc.)) with one another. In an aspect, first device 101 can employ application 1080 comprising generation component 110, assignment component 120, first transition component 130, second transition component 210, reference component 310, verification component 410, wallet component 510, adjustment component 610, logging component 710, storage component 810, detection component 910, and/or first data store 102. In another aspect, first device 101 can comprise processor 112 and memory 103. In an aspect, processor 112 can execute the computer executable components and/or computer instructions stored in memory 103.

In another aspect, system 1000 can also comprise second device 107 that can employ application 1090 comprising generation component 110, assignment component 120, first transition component 130, second transition component 210, reference component 310, verification component 410, wallet component 510, adjustment component 610, logging component 710, storage component 810, detection component 910, and/or second data store 104. In an aspect, second device 107 can comprise processor 114 and memory 108. In another aspect, processor 112 can execute the computer executable components and/or computer instructions stored in memory 108. In yet another aspect, one or more of the components of system 1000 can be electrically and/or communicatively coupled to one or more devices of system 1000 or other embodiments disclosed herein. In another aspect, system 1000 can also comprise third device 1020 (e.g., networked server device) that can employ application 1070 comprising first synchronization component 1010, memory 1030, and processor 1040.

Furthermore, in an aspect, system 1000 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 10 but illustrated in FIG. 1B). Furthermore, in an aspect, system 1000 can further comprise a first synchronization component 1010 within application 1080 of first device 101 and/or application 1090 of second device 107. In an aspect, one or more of the components of system 1000 can be electrically and/or communicatively coupled to one or more devices of system 1000 or other embodiments disclosed herein.

In an aspect, system 1000 can employ a processor (e.g., processor 112 of first device 101 and/or processor 114 of second device 107) to execute first synchronization component 1010 that synchronizes first log data stored on a second data store of the second device 107 and second log data stored on a third data store of a third device based on an interventional synchronization technique or a non-interventional synchronization technique. In an aspect, logging component 710 can generate log data in association with an occurrence of one or more transaction. Furthermore, the log data can be stored (e.g., using storage component 810) on first device 101 and/or second device 107. In yet another aspect, first synchronization component 1010 can facilitate a synchronization also referred to as replication of log data by enabling a mesh network to be generated between one or more smart card devices (e.g., first device 101) and/or terminal devices (e.g., second device 107) based on a predefined one or more algorithm.

In an aspect, first synchronization component 1010 can utilize a defined interval or define a triggering event to be performed by a device (e.g., first device 101, second device 107, or another terminal device) to facilitate performance of log data replication tasks. As a non-limiting example, processor 114 of second device 107 can execute detection component 910 to detect (e.g., using Wi-Fi technologies or BLUETOOTH®) the presence of one or more terminal devices (e.g., validation terminals similar to second device 107) capable of communicating with second device 107. Upon a detection, by second device 107 employing detection component 910, of another terminal device, synchronization component 1010 employs an algorithm that performs a mutual authentication of second device 107 and the other terminal device. The mutual authentication procedure can be conducted based on an evaluation of SSL certificates (e.g., data files digitally bound to cryptographic keys).

In an aspect, second device 107 and another validation terminal device mutually authenticate one another and transmit log data, payment data, and/or other such data types corresponding to a set of transactions stored on each respective device to one another. Accordingly, the log data (and other transactional data) stored at first store 102 of second device 107 is transmitted and merged with the log data of the other terminal device. Furthermore, the log data of the other terminal device is transmitted and merged with log data of second device 107. Upon completion of the data transfer between the one or more terminal devices, each device has identical copies of log data corresponding to several transactions and thus the replication operation is complete. Furthermore, in an aspect, several terminals can repeat such operation such that numerous terminal devise carry replicated copies of log data of other such devices. Thus, after all terminal devices have replicated and merged log data of all other terminal devices with one another, several backups of log data for every transaction that occurred at the event can be stored (e.g., using storage component 810) at each terminal therefore forming a mesh network between the several terminal devices.

In another aspect, first synchronization component 1010 can utilize numerous modes to perform synchronization tasks of log data between several devices. In an aspect, first synchronization component 1010 can utilize a fully automatic mechanism, in which terminal devices connect with one another and exchange transaction logs absent any receipt of input data from an operator. In another aspect, first synchronization component 1010 can utilize an input data responsive mechanism, in which terminal devices connect with one another and exchange transaction logs based on receipt of input data representing instructions to initiate the synchronization process. In a non-limiting embodiment, the input data responsive mechanism requires the several terminals to be within a defined proximity of one another and the synchronization operation does not commence until input data is received to initiate such operation.

As a consequence of the data replication that occurs by employing first synchronization component 1010, the several terminal devices each store a replica of all transaction logs from all terminals associated with a particular event. Furthermore, each terminal is capable of alerting respective terminals of the failure to synchronize data with one or more terminal for longer than a defined time interval, therefore generating a notification after synchronization processes have occurred or failed. For instance, a defined time interval can be six hours. As such, a notification of whether synchronization occurred or failed can be transmitted to respective terminal devices subsequent to and corresponding to the defined six-hour time interval.

In another aspect, system 1000 can employ first synchronization component 1010 in connection with storage component 810 to utilize storage availability on smart card devices (e.g., first device 101) to facilitate efficient, productive, and reliable replication operations. As such, system 1000 can employ logging component 710 in connection with storage component 810 to generate and store log data representing the last entry of a transaction log on a terminal device (e.g., second device 107) and a smart card device (e.g., first device 101). The storage of the last entry of the transaction log on smart card devices and terminal devices can occur after the occurrence of each transaction. Furthermore, more than one transaction entry can be stored on the smart card if insufficient storage capacity exists on the terminal device.

In another aspect, the terminal device can synchronize (e.g., using first synchronization component 1010) a transaction with another terminal device according to methods described herein. Furthermore, in an aspect, upon communication between a terminal and a smart card already storing (e.g., at first data store 102) log data corresponding to one or more transaction log entries, can be stored on a second data store of the terminal device (if the log data isn't already stored on the terminal device) and removed from the smart card. In another aspect, if the log data is already stored on the terminal device, the log data can be removed from the smart card in that the log data has been replicated from the original terminal device onto the current terminal device already. Thus a replica of the log data already exists in the latter scenario. In other aspects, first synchronization component 1010 can replicate data amongst several devices to form a mesh network and a second synchronization component 1110 (e.g., described below) can be employed to synchronize time within the mesh networks as well.

Figure 11:
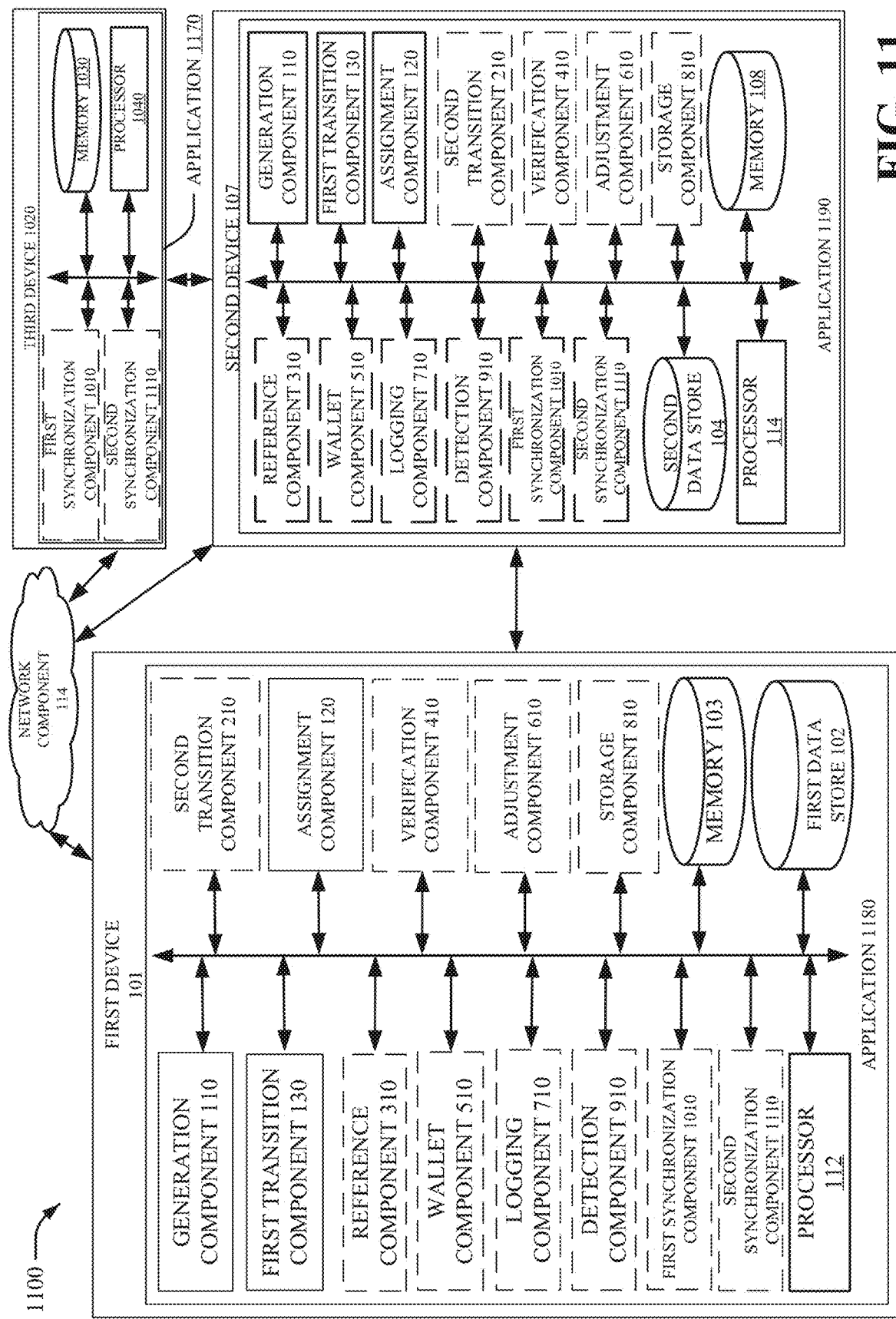
FIG. 11 illustrates a block diagram of an example, non-limiting system that can facilitate a generation of token data and a synchronization of first time data corresponding to first log data in accordance with one or more embodiments described herein.

Turning now to FIG. 11, illustrated is a block diagram of an example, non-limiting system 1100 that can facilitate a generation of token data and a synchronization of first time data corresponding to first log data in accordance with one or more embodiments described herein. Repetitive description of like elements employed in other embodiments described herein is omitted for sake of brevity.

In an aspect, system 1100 can comprise first device 101 and second device 107 that can communicate (via an online network (e.g., network component 114) or a contactless offline mechanism (e.g., RFID, Bluetooth®, etc.)) with one another. In an aspect, first device 101 can employ application 1180 comprising generation component 110, assignment component 120, first transition component 130, second transition component 210, reference component 310, verification component 410, wallet component 510, adjustment component 610, logging component 710, storage component 810, detection component 910, first synchronization component 1010, and/or first data store 102. In another aspect, first device 101 can comprise processor 112 and memory 103. In an aspect, processor 112 can execute the computer executable components and/or computer instructions stored in memory 103.

In another aspect, system 1100 can also comprise second device 107 that can employ application 1190 comprising generation component 110, assignment component 120, first transition component 130, second transition component 210, reference component 310, verification component 410, wallet component 510, adjustment component 610, logging component 710, storage component 810, detection component 910, first synchronization component 1010, and/or second data store 104. In an aspect, second device 107 can comprise processor 114 and memory 108. In another aspect, processor 112 can execute the computer executable components and/or computer instructions stored in memory 108. In yet another aspect, one or more of the components of system 1100 can be electrically and/or communicatively coupled to one or more devices of system 1100 or other embodiments disclosed herein. In another aspect, system 1100 can also comprise third device 1020 (e.g., networked server device) that can employ application 1170 comprising first synchronization component 1010, second synchronization component 1110, memory 1030, and processor 1040.

Furthermore, in an aspect, system 1100 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 11 but illustrated in FIG. 1B). Furthermore, in an aspect, system 1100 can further comprise a second synchronization component 1110 within application 1180 of first device 101 and/or application 1190 of second device 107. In an aspect, one or more of the components of system 1100 can be electrically and/or communicatively coupled to one or more devices of system 1100 or other embodiments disclosed herein.

In an aspect, system 1100 can employ a processor (e.g., processor 112 of first device 101 and/or processor 114 of second device 107) to execute a second synchronization component 1110 that synchronizes first time data corresponding to first log data of the second device 107 with second time data corresponding to second log data of a third device based on one or more time tracking algorithm. In an aspect, system 1000 can employ a local server that stores a set of time data representing reference times for all transactional events corresponding to all terminal devices and/or smart cards within a mesh network. In another aspect, one or more terminals within the mesh network can store a subset of time data representing a value referred to as a Time To Server (TToServer) at the third device (e.g., local server). In an aspect, the TToServer can represent an amount of time that has passed on a device since a time associated with the last synchronization event with the server.

In an aspect, upon an occurrence of a synchronization event (e.g., using synchronization component 1110) corresponding to two or more devices (e.g., terminal devices and/or smart card devices) with the server, the TToServer data is represented by a zero value. In another aspect, the TToServer time value can be incremented (from value zero) or moved in connection with a Clock-R (e.g., an automatically synchronized clock based on a time code). Furthermore, in an aspect, at each time a terminal device reboots, TToServer data is set to a large number (e.g., 10E16), and is not incremented any more than the large number.

In another aspect, where TToServer data is inherited, for instance, if a first terminal device corresponds with first TToServer data represented by X, and second terminal device corresponds with a second TToServer data represented by Y, and X is less than Y, and the first terminal device and the second terminal device are synchronized with one another, then the time is updated on the second terminal device to match the time data (e.g., first TToServer data) associated with the first terminal device. Accordingly, the second TToServer data is set to X in order to match the first TToServer data. In yet another aspect, if a first terminal device corresponds with first TToServer data represented by X, and second terminal device corresponds with second TToServer data represented by Y, and X is less than Y, and the first terminal device and the second terminal device are not synchronized with one another (e.g., because they are in synch), then the TToServer data corresponding to the second terminal device is set to X.

In a non-limiting example embodiment, an operating system employed by the one or more terminal devices can provide two clocks, a System.currentTimeMillis clock (e.g., also referred to as Clock-W) and an ElapsedRealtime clock (e.g., also referred to as Clock-R). In an aspect, Clock-W or a "wall" clock can be adjusted to meet time precisions requirements, can survive reboots of terminal devices and/or server devices, does not survive long battery outages, and can be adjusted based on input data received at an interface. In another aspect, Clock-R can represent the time from the occurrence of the last device (e.g., server device, terminal device) boot, where Clock-R represents a confident measure of time intervals, cannot be changed based on input data received at an interface, and does not survive reboots.

In an aspect, during a recording of transactions onto a server device or terminal device, both Clock-W and Clock-R time data can be recorded. Furthermore, the Elapsed-to-Server time metric (e.g., also referred to as Delta-R) can be recorded and represents the difference between the server time data (as received during a sync) and an ElapsedRealtime metric. In another aspect, the Delta-R can be associated with as one of the more significant values being updated by synchronization processes executed by second synchronization component 1110. Furthermore, a Current-to-Server time (also referred to as Delta-W) is recorded on a server device, which represents the difference between a server time (as received during a sync), and a System.currentTimeMillis time. Furthermore, second synchronization component 1110 also synchronizes and/or records time data associated with a Known Good Time (KGT), where KGT=Clock-R+Delta-R.

Thus, in an aspect, synchronization component 1110 facilitates a recordation of Delta-W, Clock-R, Clock-W, and Delta-R metrics for each transaction associated with terminal devices and smart card devices. Furthermore, each terminal device (e.g., second device 107) can comprise a time-tracking module component that executes as an operating system process, independent of the application, such that the time tracking module component can capture time changing events even in instances where the application is not executing. In another aspect, second synchronization component 1110 can facilitate a recordation of Level of Trust to Timestamp data (LOT) associated with any terminal device at a given time. In an aspect, each LOT value can represent a status and accordingly, second synchronization component 1110 can record the following LOT values, including but not limited to, LOT=0, LOT=1, LOT=2, LOT=3, and/or LOT=4.

In an aspect, LOT=0 represents a status assigned to particular transactions that have occurred using a terminal (not a status of the terminal device itself). The LOT=0 indicates that timestamps for transactions that occurred on a terminal device have been hopelessly lost. Accordingly, second synchronization component 1110 sets the TToServer data to 10E16 and such time data is not incremented. Furthermore, in an aspect, LOT=1 represents the identifier "take this terminal to service" which indicates that such terminal is not used as a reference for purposes of replication. In another aspect, the TToServer is set to 10E16 and is not incremented in association with an assignment of the status LOT=1 to a terminal.

In another aspect, LOT=2 represents that a timestamp is not set or that a problem with a time setting is detected. A message can be transmitted and displayed at a terminal device in accordance with this problem reciting, "Do not reboot! Synch Needed." In an aspect, the message can be displayed at the terminal displace based on the terminal device staying in LOT=2 state for approximately more than ten minutes after the first transaction is recorded on the terminal device in the LOT=2 mode. A terminal in LOT=2 mode is not utilized as a reference terminal and a TToServer data is set to 10E16 and is not incremented. In yet another aspect, LOT=3 represents a terminal device status indicated that a reboot has occurred and no timestamp problem is detected. A terminal device with a LOT=3 status is not used as a reference. In an aspect, the TToServer is set to 10E16 and is not incremented. In a scenario where a terminal device is designated as having an LOT=4 status, the device is identified as having synched with another device. A terminal device with a LOT=4 designation can be referenced and the TToServer data can be tracked and incremented.

In a non-limiting, example scenario where two terminal devices are designated with a LOT=4 status and during a synchronization task (e.g., using second synchronization component 1110) the local server device discovers that the amount of adjustment has to be greater than a threshold level, then both terminals must be designated and marked LOT=1, and no synchronization event is performed. In another aspect, second synchronization component 1110 can facilitate an adjustment of time associated with a tracking time-changing events corresponding to one or more terminal devices. In an aspect, second synchronization component 1110 can facilitate execution of monitoring tasks associated with ACTION_TIME_CHANGED (ATC) Constant Value: "android.intent.action. TIME_SET", which represents a signal from an operating system that indicates when a System.currentTimeMillis was changed by a terminal device based on received input data.

In the event second synchronization component 1110 receives a signal related to a time change; a Delta-W is adjust appropriately, and/or flag data is assigned (e.g., using assignment component 120) to the next recorded transaction to indicate that a Clock-W is different. In the event of a reboot, a reboot is detected by the fact that Clock-R is reset. In a scenario where the Clock-W does not change, then a new Delta-R is calculated based on a last known Clock-W. Furthermore, in an aspect, second synchronization component 1110 can estimate if Clock-W was lost by comparing (e.g., using reference component 310) current Clock-W to a last known Clock-W. In an aspect, if the current Clock-W is associated with a future time as compared to last known Clock-W, but current Clock-W is within the time limits of an event, then second synchronization component 1110 assumes that current Clock-W has not been lost and assigns (e.g., using assignment component 1110) LOT=3 status to the terminal device.

If the current Clock-W is represented by a time that is in the past as compared to a last known Clock-W, second synchronization component 1110 assumes that the current Clock-W time has been lost. In such instance, the terminal device can be assigned (e.g., using assignment component 1110) a status of LOT=2. In another aspect, second synchronization component 1110 in connection with detection component 910 can detect a situation in which a second reboot occurs to a terminal device at a time when the status of terminal device is at LOT=2. In such case, a previous batch of transactions, after the first reboot, can be marked as LOT=1 representing that the time stamps are forever lost.

Figure 12:
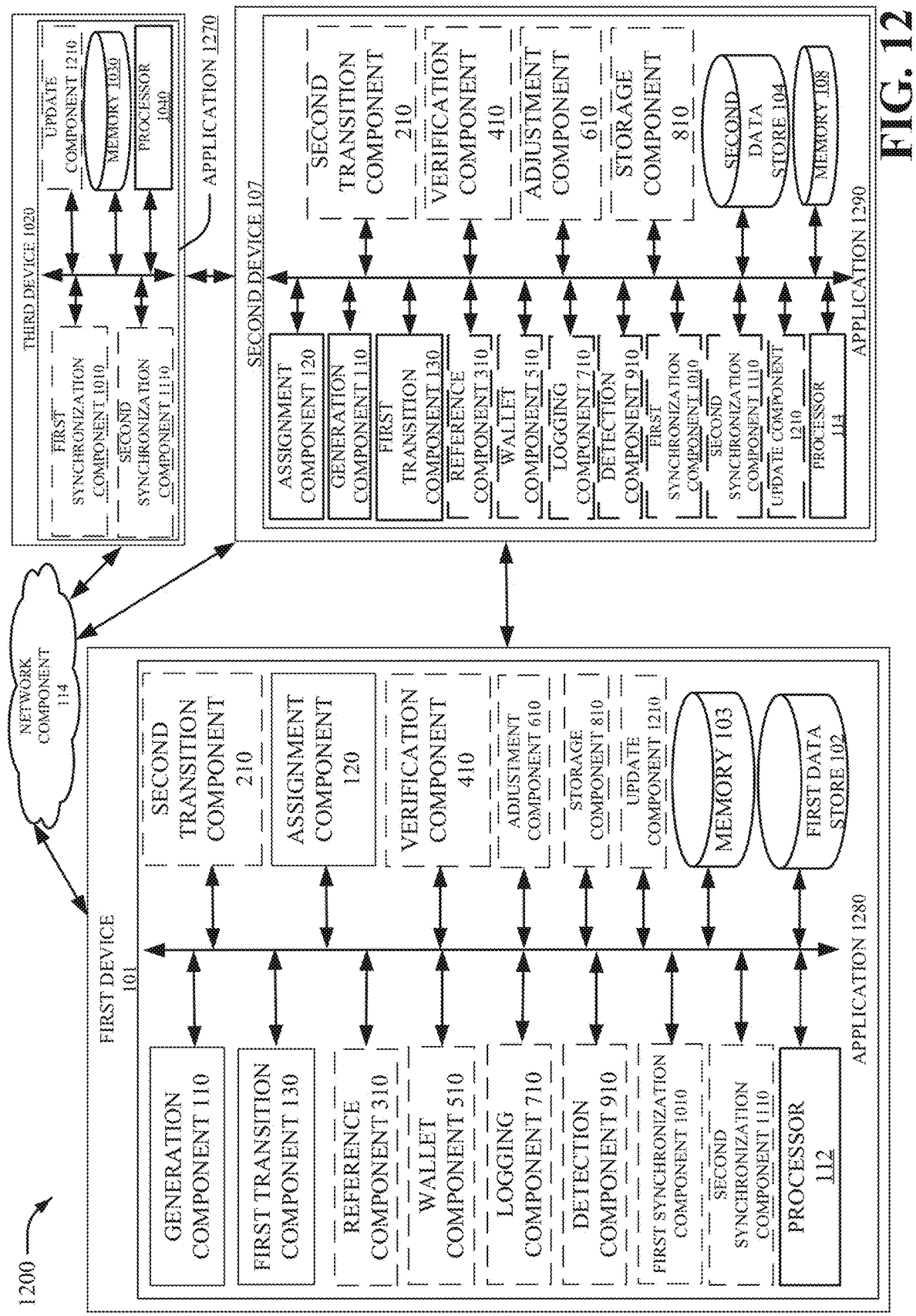
FIG. 12 illustrates a block diagram of an example, non-limiting system that can facilitate a generation of token data and updated synchronization of time data corresponding to log data in accordance with one or more embodiments described herein.

Turning now to FIG. 12, illustrates a block diagram of an example, non-limiting system that can facilitate a generation of token data and updated synchronization of time data corresponding to log data in accordance with one or more embodiments described herein. Repetitive description of like elements employed in other embodiments described herein is omitted for sake of brevity.

In an aspect, system 1200 can comprise first device 101 and second device 107 that can communicate (via an online network (e.g., network component 114) or a contactless offline mechanism (e.g., RFID, Bluetooth®, etc.)) with one another. In an aspect, first device 101 can employ application 1280 comprising generation component 110, assignment component 120, first transition component 130, second transition component 210, reference component 310, verification component 410, wallet component 510, adjustment component 610, logging component 710, storage component 810, detection component 910, first synchronization component 1010, second synchronization component 1110 and/or first data store 102. In another aspect, first device 101 can comprise processor 112 and memory 103. In an aspect, processor 112 can execute the computer executable components and/or computer instructions stored in memory 103.

In another aspect, system 1200 can also comprise second device 107 that can employ application 1190 comprising generation component 110, assignment component 120, first transition component 130, second transition component 210, reference component 310, verification component 410, wallet component 510, adjustment component 610, logging component 710, storage component 810, detection component 910, first synchronization component 1010, second synchronization component 1110, and/or second data store 104. In an aspect, second device 107 can comprise processor 114 and memory 108. In another aspect, processor 112 can execute the computer executable components and/or computer instructions stored in memory 108. In yet another aspect, one or more of the components of system 1200 can be electrically and/or communicatively coupled to one or more devices of system 1200 or other embodiments disclosed herein. In another aspect, system 1200 can also comprise third device 1020 (e.g., networked server device) that can employ application 1270 comprising first synchronization component 1010, second synchronization component 1110, update component 1210, memory 1030, and processor 1040.

Furthermore, in an aspect, system 1200 and the several other system embodiments disclosed herein can comprise state data stored in first data store 102, including, but not limited to, no state data 181, valid state data 183, in state data 187, out state data 191, no ticket data 185, and/or invalid state data 189 (all state data not illustrated in FIG. 12 but illustrated in FIG. 1B). Furthermore, in an aspect, system 1200 can further comprise an update component 1210 within application 1280 of first device 101 and/or application 1290 of second device 107. In an aspect, one or more of the components of system 1200 can be electrically and/or communicatively coupled to one or more devices of system 1200 or other embodiments disclosed herein.

In an aspect, system 1200 can employ a processor (e.g., processor 112 of first device 101 and/or processor 114 of second device 107) to execute an update component 1210 that performs an updated synchronization of the first time data corresponding to the first log data based on an occurrence of a reboot event corresponding to the second device or a synchronization of the first time data. In an aspect, second synchronization component 1110 can assign or record timestamp data to each transaction or change in data that has occurred on each terminal device. Furthermore, in an aspect, second synchronization component 1110 can transfer and synchronize all data assigned a time stamp that is later in time than a timestamp of synchronized data from a previous synchronization event.

In another aspect, second synchronization component 1110 in connection with update component 1210 can synchronize time stamp data associated with transaction logs of terminal devices to a point in time associated with an occurrence of any one of a Trust Division Event (TDE). In an aspect, a trust division event can be a reboot of any one or more terminal device or an occurrence of a synchronization (e.g., using second synchronization component 1110) of time stamp data. Thus, in an aspect, update component 1210 can facilitate an updated synchronization of time state data to occur when frequently and regularly in order to mitigate any catastrophic losses of data (e.g., log data, transaction data, time stamp data, token data, etc.).

In another aspect, synchronization component 1110 in connection with update component 1210 can determine one or more values corresponding to time difference tolerances. In an aspect, a first time period can be represented as no difference at all, a second time period can be represented as a time period that is adjustable, and a third time period can be represented as a time period referred to as a "major error". Furthermore, in an aspect, the third time period can be assigned (e.g., using assignment component 120) a status of LOT=0, which occurs when a time difference is larger than a threshold time difference.

In another aspect, synchronization component 1110 and/or update component 1210 can synchronize time stamp data based on a mesh connection between two or more terminal devices based on a comparison (e.g., using reference component 310) of LOT data, KGT data, and TToServer data. Furthermore, time stamp data can be adjusted (e.g., using second synchronization component 1110 and/or update component 1210) in the following scenarios; if one or more terminal devices have a status of LOT=4 and no terminal device has a LOT less than 4, if an adjustment constitutes an adjustment of less than a "major error", and if during a time data synchronization event a terminal with LOT=4 (and with a lower value TToServer data in the case where both terminals have a LOT=4).

FIG. 13 illustrates a flow diagram of an example, non-limiting computer-implemented method 1300 that generates token data capable of representing a change in states or status in accordance with one or more embodiments described herein. In an aspect, one or more of the components described in computer-implemented method 1300 can be electrically and/or communicatively coupled to one or more devices. Repetitive description of like elements employed in other embodiments described herein is omitted for sake of brevity. In some implementations, at reference numeral 1310, a system operatively coupled to a processor (e.g., processor 112 and/or processor 114) can generate (e.g., using generation component 110), by a system comprising a processor, a set of token data for storage at a first data store of a first device, wherein the set of token data comprises at least two or more of flag data, no state data, first state data, second state data, event identification data, or token identification data. At reference numeral 1320, the system can assign (e.g., using assignment component 120) the flag data to the no state data within the first data store of the first device. At reference numeral 1330, the system can reassign (e.g., using first transition component 130) the flag data from the no state data to the first state data based on an occurrence of a first validation event by a second device.

FIG. 14 illustrates a flow diagram of an example, non-limiting computer-implemented method 1400 that reassigns flag data from a first state to a second state in accordance with one or more embodiments described herein.

In an aspect, one or more of the components described in computer-implemented method 1400 can be electrically and/or communicatively coupled to one or more devices. Repetitive description of like elements employed in other embodiments described herein is omitted for sake of brevity. In some implementations, at reference numeral 1410, a system operatively coupled to a processor (e.g., processor 112 and/or processor 114) can generate (e.g., using generation component 110), by a system comprising a processor, a set of token data for storage at a first data store of a first device, wherein the set of token data comprises at least two or more of flag data, no state data, first state data, second state data, event identification data, or token identification data. At reference numeral 1420, the system can assign (e.g., using assignment component 120) the flag data to the no state data within the first data store of the first device. At reference numeral 1430, the system can reassign (e.g., using first transition component 130) the flag data from the no state data to the first state data based on an occurrence of a first validation event by a second device. At reference numeral 1440, the system can reassign (e.g., using second transition component 210) the flag data from the first state data to the second state data based on a second validation event by the second device, wherein the first validation event and the second validation event is a detection of the first device by the second device.

FIG. 15 illustrates a flow diagram of an example, non-limiting computer-implemented method 1500 that compares event identification data and token data to known event identification data and known token identification data respectively in accordance with one or more embodiments described herein.

In an aspect, one or more of the components described in computer-implemented method 1400 can be electrically and/or communicatively coupled to one or more devices. Repetitive description of like elements employed in other embodiments described herein is omitted for sake of brevity. In some implementations, at reference numeral 1510, a system operatively coupled to a processor (e.g., processor 112 and/or processor 114) can generate (e.g., using generation component 110), by a system comprising a processor, a set of token data for storage at a first data store of a first device, wherein the set of token data comprises at least two or more of flag data, no state data, first state data, second state data, event identification data, or token identification data. At reference numeral 1520, the system can assign (e.g., using assignment component 120) the flag data to the no state data within the first data store of the first device. At reference numeral 1530, the system can compare (e.g., using reference component 310) the event identification data and the token data stored on the first data store of the first device to known event identification data and known token identification data stored on a second data store of the second device. At reference numeral 1540, the system can reassign (e.g., using first transition component 130) the flag data from the no state data to the first state data based on an occurrence of a first validation event by a second device.

FIG. 16 illustrates a flow diagram of an example, non-limiting computer-implemented method 1600 that verifies that event identification data and token data are substantially similar to known event identification data and known token identification data respectively in accordance with one or more embodiments described herein.

In an aspect, one or more of the components described in computer-implemented method 1400 can be electrically and/or communicatively coupled to one or more devices. Repetitive description of like elements employed in other embodiments described herein is omitted for sake of brevity. In some implementations, at reference numeral 1610, a system operatively coupled to a processor (e.g., processor 112 and/or processor 114) can generate (e.g., using generation component 110), by a system comprising a processor, a set of token data for storage at a first data store of a first device, wherein the set of token data comprises at least two or more of flag data, no state data, first state data, second state data, event identification data, or token identification data. At reference numeral 1620, the system can assign (e.g., using assignment component 120) the flag data to the no state data within the first data store of the first device.

At reference numeral 1630, the system can compare (e.g., using reference component 310) the event identification data and the token data stored on the first data store of the first device to known event identification data and known token identification data stored on a second data store of the second device. At reference numeral 1640, the system verifies (e.g., using verification component 410), that the event identification data and the token data are substantially similar to the known event identification data and the known token identification data respectively, based on a comparison of the event identification data and the token data to the known event identification data and the known token identification data. At reference numeral 1650, the system can reassign (e.g., using first transition component 130) the flag data from the no state data to the first state data based on an occurrence of a first validation event by a second device.

Figure 17:
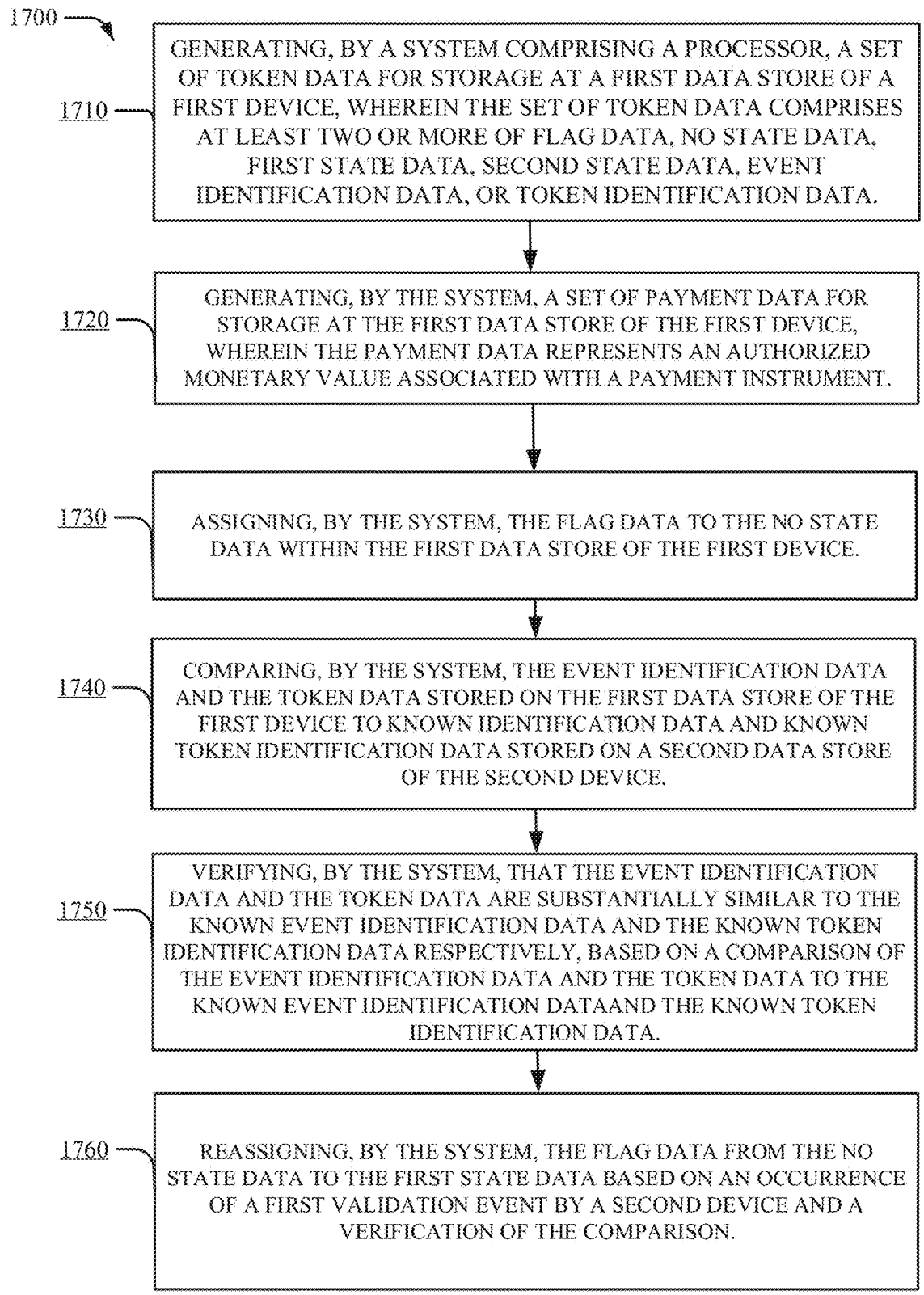
FIG. 17 illustrates a flow diagram of an example, non-limiting computer-implemented method that generates a set of payment data in accordance with one or more embodiments described herein.

FIG. 17, illustrates a flow diagram of an example, non-limiting computer-implemented method 1700 that generates a set of payment data in accordance with one or more embodiments described herein.

In an aspect, one or more of the components described in computer-implemented method 1700 can be electrically and/or communicatively coupled to one or more devices. Repetitive description of like elements employed in other embodiments described herein is omitted for sake of brevity. In some implementations, at reference numeral 1710, a system operatively coupled to a processor (e.g., processor 112 and/or processor 114) can generate (e.g., using generation component 110), by a system comprising a processor, a set of token data for storage at a first data store of a first device, wherein the set of token data comprises at least two or more of flag data, no state data, first state data, second state data, event identification data, or token identification data. At reference numeral 1720, the system generates (e.g., using wallet component 510) a set of payment data for storage at the first data store of the first device, wherein the payment data represents an authorized monetary value associated with a payment instrument. At reference numeral 1730, the system can assign (e.g., using assignment component 120) the flag data to the no state data within the first data store of the first device.

At reference numeral 1740, the system can compare (e.g., using reference component 310) the event identification data and the token data stored on the first data store of the first device to known event identification data and known token identification data stored on a second data store of the second device. At reference numeral 1750, the system verifies (e.g., using verification component 410), that the event identification data and the token data are substantially similar to the known event identification data and the known token identification data respectively, based on a comparison of the event identification data and the token data to the known event identification data and the known token identification data. At reference numeral 1760, the system can reassign (e.g., using first transition component 130) the flag data from the no state data to the first state data based on an occurrence of a first validation event by a second device.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because a generating of token data capable of transitioning through several status's is performed by components executed by a processor (e.g., processor 112) established from a combination of electrical and mechanical components and circuitry, a human is unable to replicate or perform the subject data packet configuration and/or the subject communication between processing components, a generation component, a first transitioning component and/or an assignment component. Furthermore, the similarity comparisons between token identification data and known identification data sets are based on comparative determinations that only a computer can perform such as iterative comparisons, evaluation, and review of token data based on unique signatures, encrypted data, and/or authentication techniques within the data and use of computer-implemented operations to recognize digital patterns and other such identifiers within computer generated data representations to access data and transition data into representative states. Furthermore, the access of transitionable token data using generation of digital data based on pattern recognition algorithms and data similarity algorithms as well as storage and retrieval of digitally generated data to and from a memory (e.g., using memory 108) in accordance with computer generated access patterns cannot be replicated by a human. In another aspect, the systems, methods, and program products disclosed herein can interact with equipment and devices that facilitate entrance or exit into a venue as well (e.g., interact with a door or turn gate mechanism, such as unlocking, based on token lifecycle stages and validation of such stages, etc.).

Figure 18:
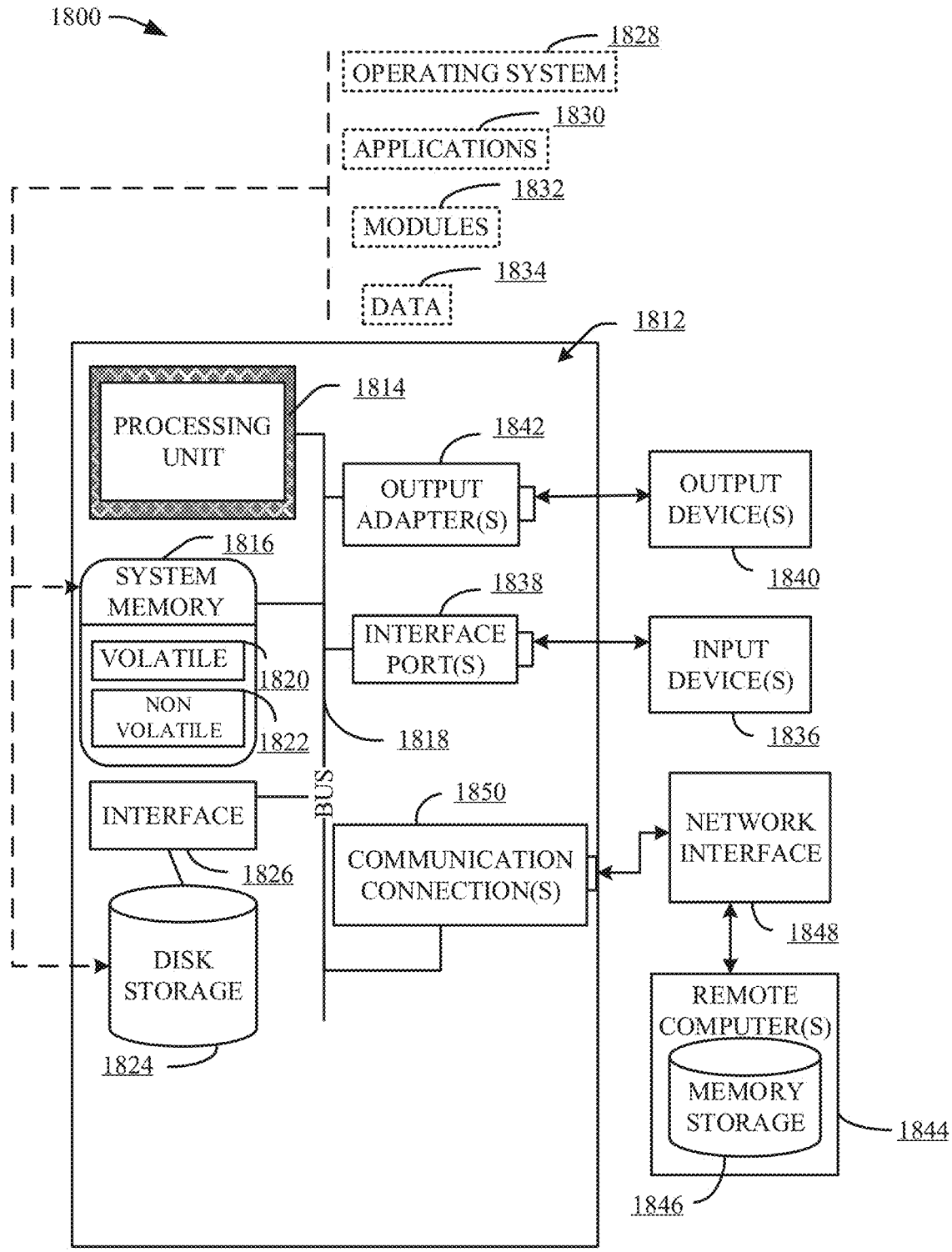
FIG. 18 illustrates a block diagram of an example, non-limiting operating environment in which one or more embodiments described herein can be facilitated.

In order to provide a context for the various aspects of the disclosed subject matter, FIG. 18 as well as the following discussion is intended to provide a general description of a suitable environment in which the various aspects of the disclosed subject matter can be implemented. FIG. 18 illustrates a block diagram of an example, non-limiting operating environment in which one or more embodiments described herein can be facilitated. With reference to FIG. 18, a suitable operating environment 1800 for implementing various aspects of this disclosure can also include a computer 1812. The computer 1812 can also include a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814. The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1816 can also include volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1812 can also include removable/non-removable, volatile/non-volatile computer storage media. FIG. 18 illustrates, for example, a disk storage 1824. Disk storage 1824 can also include, but is not limited to, devices like a magnetic disk drive, floppy disk drive, tape drive, Jaz drive, Zip drive, LS-100 drive, flash memory card, or memory stick. The disk storage 1824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used, such as interface 1826. FIG. 18 also depicts software that acts as an intermediary between users and the basic computer resources described in the suitable operating environment 1800. Such software can also include, for example, an operating system 1828. Operating system 1828, which can be stored on disk storage 1824, acts to control and allocate resources of the computer 1812.

System applications 1830 take advantage of the management of resources by operating system 1828 through program modules 1832 and program data 1834, e.g., stored either in system memory 1816 or on disk storage 1824. It is to be appreciated that this disclosure can be implemented with various operating systems or combinations of operating systems. A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port can be used to provide input to computer 1812, and to output information from computer 1812 to an output device 1840. Output adapter 1242 is provided to illustrate that there are some output device 1840 like monitors, speakers, and printers, among other such output device 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a computer, a server, a router, a network PC, a workstation, a microprocessor based appliance, a peer device or other common network node and the like, and typically can also include many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1850 refers to the hardware/software employed to connect the network interface 1848 to the system bus 1818. While communication connection 1850 is shown for illustrative clarity inside computer 1812, it can also be external to computer 1812. The hardware/software for connection to the network interface 1848 can also include, for exemplary purposes only, internal and external technologies such as, modems including regular telephone grade modems, cable modems and DSL modems, ISDN adapters, and Ethernet cards.

Figure 19:
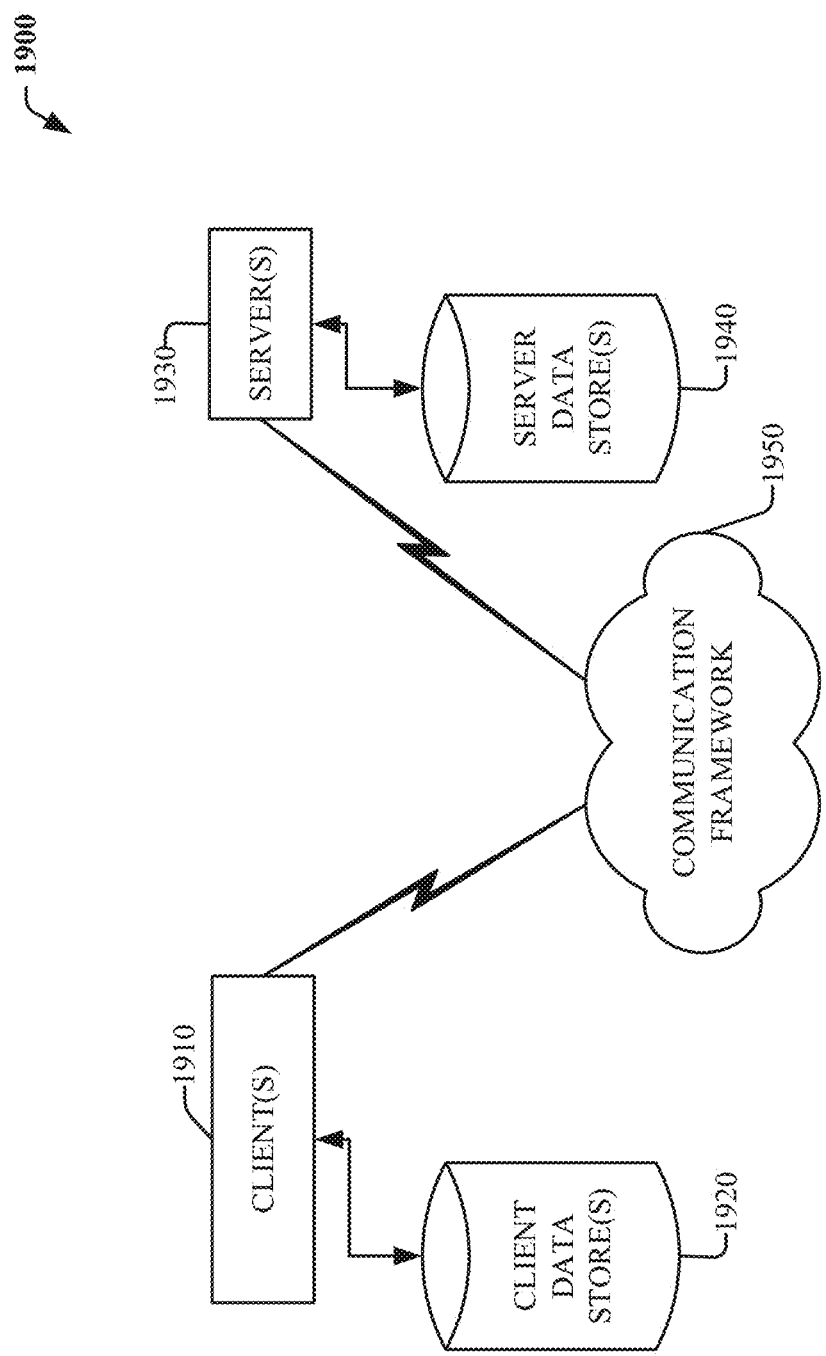
FIG. 19 illustrates a block diagram representing an exemplary non-limiting computing system or operating environment in which the various embodiments may be implemented.

Referring now to FIG. 19, there is illustrated a schematic block diagram of a computing environment 1900 in accordance with this disclosure. The system 1900 includes one or more client(s) 1902 (e.g., laptops, smart phones, PDAs, media players, computers, portable electronic devices, tablets, and the like). The client(s) 1902 can be hardware and/or software (e.g., threads, processes, computing devices). The system 1900 also includes one or more server(s) 1904. The server(s) 1904 can also be hardware or hardware in combination with software (e.g., threads, processes, computing devices). The servers 1904 can house threads to perform transformations by employing aspects of this disclosure, for example. One possible communication between a client 1902 and a server 1904 can be in the form of a data packet transmitted between two or more computer processes wherein the data packet may include video data. The data packet can include a metadata, e.g., associated contextual information, for example. The system 1900 includes a communication framework 1906 (e.g., a global communication network such as the Internet, or mobile network(s)) that can be employed to facilitate communications between the client(s) 1902 and the server(s) 1904.

Communications can be facilitated via a wired (including optical fiber) and/or wireless technology. The client(s) 1902 include or are operatively connected to one or more client data store(s) 1908 that can be employed to store information local to the client(s) 1902 (e.g., associated contextual information). Similarly, the server(s) 1904 are operatively include or are operatively connected to one or more server data store(s) 1910 that can be employed to store information local to the servers 1904. In one embodiment, a client 1902 can transfer an encoded file, in accordance with the disclosed subject matter, to server 1904. Server 1904 can store the file, decode the file, or transmit the file to another client 1902. It is to be appreciated, that a client 1902 can also transfer uncompressed file to a server 1904 and server 1904 can compress the file in accordance with the disclosed subject matter. Likewise, server 1904 can encode video information and transmit the information via communication framework 1906 to one or more clients 1902.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising: a memory that stores computer executable components; a processor that executes the computer executable components stored in the memory, wherein the computer executable components comprise:
    a generation component that generates a set of token data for storage at a first data store of a first device, wherein the set of token data comprises one or more of flag data, no state data, first state data, second state data, event identification data, or token identification data;
    a assignment component that assigns the flag data to the no state data within the first data store of the first device;
    a first transition component that reassigns the flag data from the no state data to the first state data based on an occurrence of a first validation event by a second device;
    a logging component that generates first log data representing a reassignment of the flag data from the no state data to the first state data;
    a removal component that removes the first log data from the first data store upon a first occurrence of a transference of the first log data to at least two different data stores that are not the first data store or upon a second occurrence of transference of the first log data to one other data store that is not the first data store and a detection, by the first device, of the first log data on another data store that is not the first store and not the one other data store; and a wallet component that generates a set of payment data for storage at the first data store of the first device, wherein the payment data represents an authorized monetary value associated with a payment instrument.

2. The system of claim 1, further comprising a second transition component that reassigns the flag data from the first state data to the second state data based on a second validation event by the second device, wherein the first validation event and the second validation event is a detection of the first device by the second device.

3. The system of claim 1, further comprising a reference component that compares, by the second device, the event identification data and the token data stored on the first data store of the first device to known event identification data and known token identification data stored on a second data store of the second device.

4. The system of claim 3, further comprising a verification component that verifies, by the second device, that the event identification data and the token data are substantially similar to the known event identification data and the known token identification data respectively, based on a comparison of the event identification data and the token data to the known event identification data and the known token identification data.

5. The system of claim 1, further comprising an adjustment component that modifies the set of payment data to represent an increase or decrease in the authorized monetary value.

6. The system of claim 1, wherein the logging component generates log data associated with any transactional event between at least two of the first device, the second device, and other device that is not the first device and second device.

7. The system of claim 2, wherein the second state data represents at least one of an inside status, an outside status, or an invalid status.

8. The system of claim 1, further comprising a storage component that stores the set of token data for storage at a first data store of a first device.

9. The system of claim 1, further comprising a detection component that facilitates a detection, by the second device, of the first device in an offline network environment based on one or more authentication technologies.

10. The system of claim 6, further comprising a first synchronization component that synchronizes the first log data stored on a second data store of the second device and second log data stored on a third data store of the third device based on an interventional synchronization technique or a non-interventional synchronization technique.

11. The system of claim 6, further comprising a second synchronization component that synchronizes first time data corresponding to first log data of the second device with second time data corresponding to second log data of a third device based on one or more time tracking algorithm.

12. The system of claim 11, further comprising an update component that performs an updated synchronization of the first time data corresponding to the first log data based on an occurrence of a reboot event corresponding to the second device or a synchronization of the first time data.

13. A computer-implemented method, comprising:
generating, by a system comprising a processor, a set of token data for storage at a first data store of a first device, wherein the set of token data comprises at least two or more of flag data, no state data, first state data, second state data, event identification data, or token identification data;

assigning, by the system, the flag data to the no state data within the first data store of the first device;
a first transition component that reassigns, by the system, the flag data from the no state data to the first state data based on an occurrence of a first validation event by a second device;
generating, by the system, first log data representing a reassignment of the flag data from the no state data to the first state data;
removing, by the system, the first log data from the first data store upon a first occurrence of a transference of the first log data to at least two different data stores that are not the first data store or upon a second occurrence of transference of the first log data to one other data store that is not the first data store and a detection, by the first device, of the first log data on another data store that is not the first store and not the one other data store;
generating, by the system, a set of payment data for storage at the first data store of the first device, wherein the payment data represents an authorized monetary value associated with a payment instrument.

14. The computer-implemented method of claim 13, further comprising reassigning, by the system, the flag data from the first state data to the second state data based on a second validation event by the second device, wherein the first validation event and the second validation event is a detection of the first device by the second device.

15. The computer-implemented method of claim 13, further comprising comparing, by the system, the event identification data and the token data stored on the first data store of the first device to known event identification data and known token identification data stored on a second data store of the second device.

16. The method of claim 15, further comprising verifying, by the system, that the event identification data and the token data are substantially similar to the known event identification data and the known token identification data respectively, based on a comparison of the event identification data and the token data to the known event identification data and the known token identification data.

17. A computer program product for facilitating an efficient and secure execution of transactions by generating resources capable of transitioning through one or more states for storage on a smart card device, the computer program product comprising a non-transitory computer readable storage medium having program instructions embodied therewith, the program instructions executable by a processor to cause the processor to:
generate a set of token data for storage at a first data store of a first device, wherein the set of token data comprises at least two or more of flag data, no state data, first state data, second state data, event identification data, or token identification data; assign the flag data to the no state data within the first data store of the first device;
reassign the flag data from the no state data to the first state data based on an occurrence of a first validation event by a second device, generate first log data representing a reassignment of the flag data from the no state data to the first state data;
remove the first log data from the first data store upon a first occurrence of a transference of the first log data to at least two different data stores that are not the first data store or upon a second occurrence of transference of the first log data to one other data store that is not the first data store and a detection, by the first device, of the first log data on another data store that is not the first store and not the one other data store; and generate a set of payment data for storage at the first data store of the first device, wherein the payment data represents an authorized monetary value associated with a payment instrument.

18. The computer program product of claim 17, wherein the program instructions are further executable by the processor to cause the processor to:

generate log data associated with the first validation event or one or more transactional events.

\* \* \* \* \*